United States Patent
Yamazaki

(10) Patent No.: US 11,660,820 B2
(45) Date of Patent: May 30, 2023

(54) THREE-DIMENSIONAL SHAPED OBJECT MANUFACTURING METHOD AND THREE-DIMENSIONAL SHAPING DEVICE

(71) Applicant: Seiko Epson Corporation, Tokyo (JP)

(72) Inventor: Satoshi Yamazaki, Matsumoto (JP)

(73) Assignee: SEIKO EPSON CORPORATION

(*) Notice: Subject to any disclaimer, the term of this patent is extended or adjusted under 35 U.S.C. 154(b) by 140 days.

(21) Appl. No.: 16/885,428

(22) Filed: May 28, 2020

(65) Prior Publication Data

US 2020/0376774 A1  Dec. 3, 2020

(30) Foreign Application Priority Data

May 29, 2019  (JP) .............................. JP2019-099944

(51) Int. Cl.
  *B29C 64/393*  (2017.01)
  *B33Y 50/02*   (2015.01)
  *B33Y 30/00*   (2015.01)

(52) U.S. Cl.
  CPC ............ *B29C 64/393* (2017.08); *B33Y 30/00* (2014.12); *B33Y 50/02* (2014.12)

(58) Field of Classification Search
  CPC ........ B29C 64/393; B33Y 30/00; B33Y 50/02
  See application file for complete search history.

(56) References Cited

U.S. PATENT DOCUMENTS

| 2007/0179657 | A1 | 8/2007 | Holzwarth |
| 2017/0136703 | A1 | 5/2017 | Hayes et al. |
| 2017/0266884 | A1 | 9/2017 | Maeda |
| 2018/0264742 | A1 | 9/2018 | Yang et al. |
| 2019/0030820 | A1* | 1/2019 | Saito ..................... B29C 64/393 |

FOREIGN PATENT DOCUMENTS

| JP | 2009-525207 | A |   | 7/2009 |   |
| JP | 2017-114114 | A |   | 6/2017 |   |
| JP | 2017-165041 | A |   | 9/2017 |   |
| JP | 2018-176597 | A |   | 11/2018 |   |
| JP | 2019-025761 | A |   | 2/2019 |   |
| JP | 2019025772  | A | * | 2/2019 | ........... B29C 64/106 |
| WO | 2017/094791 | A1 |   | 6/2017 |   |

* cited by examiner

*Primary Examiner* — Joseph S Del Sole
*Assistant Examiner* — John Robitaille
(74) *Attorney, Agent, or Firm* — Harness, Dickey & Pierce, P.L.C.

(57) ABSTRACT

Provided is a three-dimensional shaped object manufacturing method. The manufacturing method includes a first step of generating intermediate data including (i) path data indicating, by a plurality of partial paths, a path through which the discharge unit discharges a shaping material while being moved and (ii) discharge control data including at least one of discharge amount information indicating a discharge amount of the shaping material in each of the partial paths and moving speed information indicating a moving speed of the discharge unit in each of the partial path, a second step of analyzing the intermediate data to specify a gap portion interposed between a first partial path and a second partial path, a third step of generating shaping data from the intermediate data by changing the discharge control data corresponding to the second partial path so as to increase, in the second partial path, a width of the shaping material stacked on a stage or on a layer that is previously formed, and a fourth step of shaping a three-dimensional shaped object by controlling the discharge unit according to the shaping data.

8 Claims, 14 Drawing Sheets

W(>Smax-Ss)

W(≦Smax−Ss)

THREE-DIMENSIONAL SHAPED OBJECT MANUFACTURING METHOD AND THREE-DIMENSIONAL SHAPING DEVICE

The present application is based on, and claims priority from, JP Application Serial Number 2019-099944, filed May 29, 2019, the disclosure of which is hereby incorporated by reference herein in its entirety.

BACKGROUND

1. Technical Field

The present disclosure relates to a three-dimensional shaped object manufacturing method and a three-dimensional shaping device.

2. Related Art

JP-T-2009-525207 (Patent Literature 1) is an example of the related art relating to a three-dimensional shaped object manufacturing method. Patent Literature 1 discloses that a nozzle that extrudes a shaping material is moved along a build path for building layers of a three-dimensional shaped object. The build path includes a peripheral path, a bulk raster path, and a remaining path. The peripheral path forms a boundary between the three-dimensional shaped object and the outside. The bulk raster path covers an area surrounded by the peripheral path. The remaining path covers an interspace area that is not covered by the peripheral path and the bulk raster path. In Patent Literature 1, a gap is prevented from being generated in the interspace area by changing an extrusion amount of the shaping material according to a width of the interspace area in the remaining path.

According to the technique disclosed in Patent Literature 1, in a case in which an end point of the bulk raster path and a start point of the remaining path are positioned away from each other, when the nozzle moves from the end point of the bulk raster path to the start point of the remaining path, the shaping material may sag from the nozzle, and thus pulls a silk thread and adheres to the three-dimensional shaped object, which may lower shaping accuracy.

SUMMARY

An aspect of the present disclosure provides a three-dimensional shaped object manufacturing method for manufacturing a three-dimensional shaped object by discharging a shaping material from a discharge unit towards a stage to stack a layer. The manufacturing method includes a first step of generating intermediate data including (i) path data indicating, by a plurality of partial paths, a path through which the discharge unit discharges the shaping material while being moved and (ii) discharge control data including at least one of discharge amount information indicating a discharge amount of the shaping material in each of the partial paths and moving speed information indicating a moving speed of the discharge unit in each of the partial path, a second step of analyzing the intermediate data to specify a gap portion interposed between a first partial path and a second partial path through which the shaping material is discharged from the discharge unit later than through the first partial path, a third step of generating shaping data from the intermediate data by changing the discharge control data corresponding to the second partial path so as to increase, in the second partial path, a width of the shaping material stacked on the stage or on the layer that is previously formed, and a fourth step of shaping the three-dimensional shaped object by controlling the discharge unit according to the shaping data.

DESCRIPTION OF EXEMPLARY EMBODIMENTS

A. First Embodiment

Figure 1:
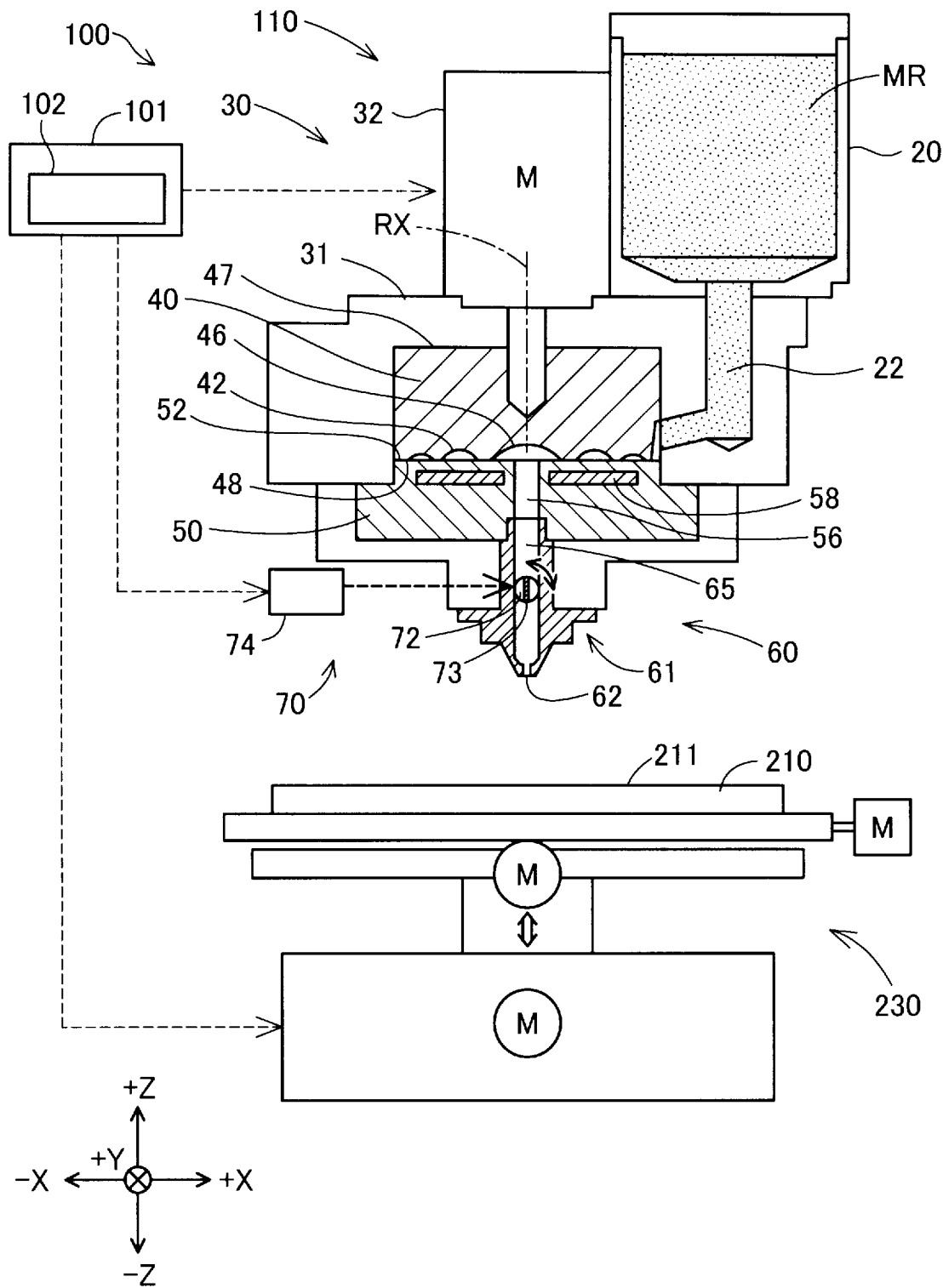
FIG. 1 is a diagram showing a schematic configuration of a three-dimensional shaping device according to a first embodiment.

FIG. 1 is a diagram showing a schematic configuration of a three-dimensional shaping device 100 according to the first embodiment. FIG. 1 shows arrows indicating X, Y, and Z directions that are orthogonal to one another. The X direction and the Y direction are parallel to a horizontal plane, and the Z direction is opposite to a gravity direction. The arrows indicating the X, Y, and Z directions are also appropriately shown in other drawings and directions shown in the other drawings correspond to the directions shown in FIG. 1. In the following description, when a direction is specified, "+" indicates a positive direction and "−" indicates a negative direction. Positive and negative symbols are used together to indicate directions.

The three-dimensional shaping device 100 includes a control unit 101 that controls the three-dimensional shaping device 100, a shaping unit 110 that generates and discharges a shaping material, a shaping stage 210 that serves as a base of a three-dimensional shaped object, and a moving mechanism 230 that controls a discharge position of the shaping material.

Under the control of the control unit 101, the shaping unit 110 melts a material in a solid state and discharges a shaping material in a paste form onto the stage 210. The shaping unit 110 includes a material supply unit 20 that is a supply source of the material before being converted into the shaping material, a shaping material generation unit 30 that converts the material into the shaping material, and a discharge unit 60 that discharges the shaping material.

The material supply unit 20 supplies a raw material MR used for generating a shaping material to the shaping material generation unit 30. The material supply unit 20 is implemented with, for example, a hopper that accommodates the raw material MR. The material supply unit 20 includes a discharge port at a lower side. The discharge port is coupled to the shaping material generation unit 30 via a communication path 22. The raw material MR is supplied to the material supply unit 20 in a form of pellet, powder, or the like. An ABS resin material in a pellet form is used in the present embodiment.

The shaping material generation unit 30 generates a paste-like shaping material that exhibits flowability by melting the raw material MR supplied from the material supply unit 20, and guides the shaping material to the discharge unit 60. The shaping material generation unit 30 includes a screw case 31, a drive motor 32, a flat screw 40, and a screw facing portion 50.

Figure 2:
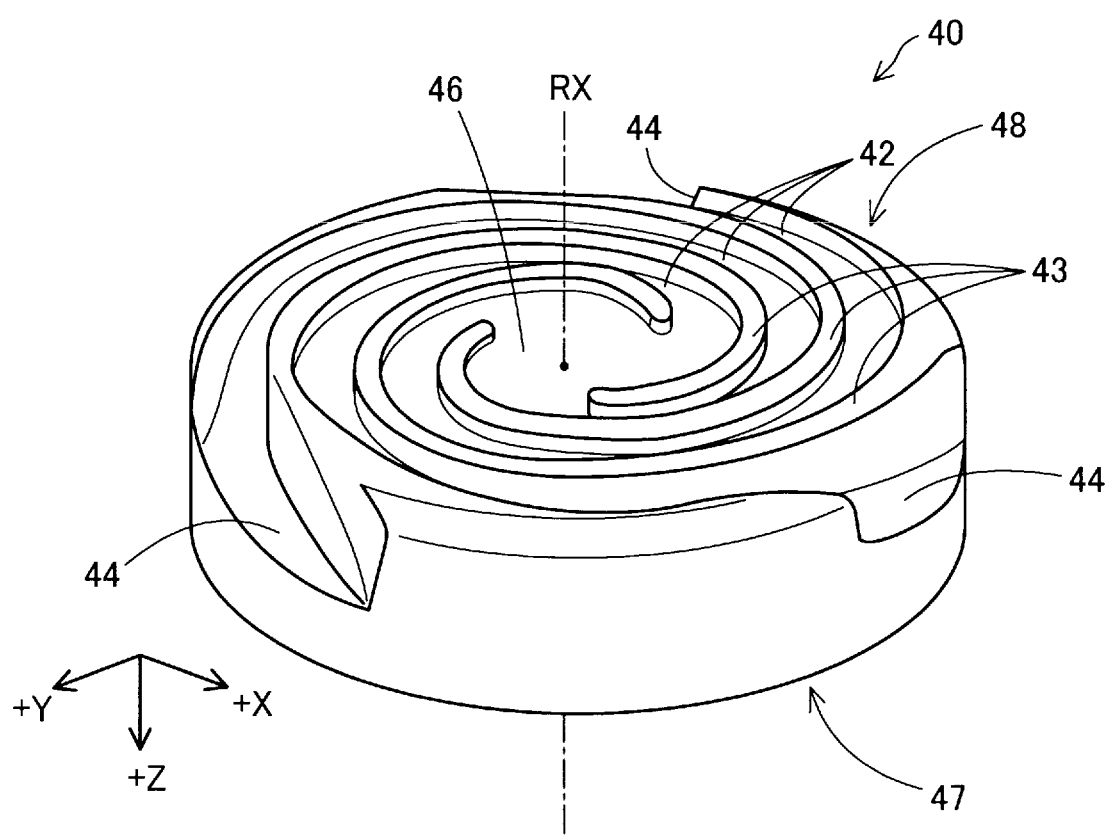
FIG. 2 is a perspective view showing a schematic configuration of a lower surface side of a flat screw.
Figure 3:
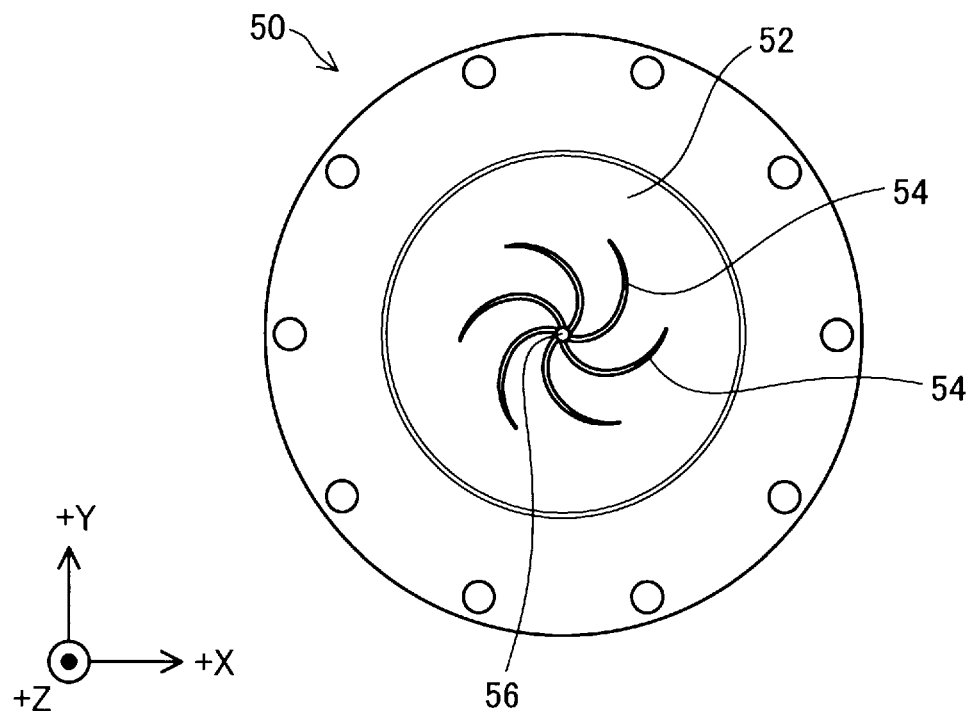
FIG. 3 is a schematic plan view showing an upper surface side of a screw facing portion.

FIG. 2 is a perspective view showing a schematic configuration of a lower surface 48 side of the flat screw 40. In order to facilitate understanding of the technique, FIG. 2 shows the flat screw 40 in a state in which a positional relationship between an upper surface 47 and a lower surface 48 shown in FIG. 1 is reversed in a vertical direction. FIG. 3 is a schematic plan view showing an upper surface 52 side of the screw facing portion 50. The flat screw 40 has a substantially cylindrical shape whose height is smaller than diameter in an axial direction which is a direction along a central axis of the flat screw 40. The flat screw 40 is disposed in a manner in which a rotation axis RX serving as a rotation center of the flat screw 40 is parallel to the Z direction.

The flat screw 40 is accommodated in the screw case 31. An upper surface 47 side of the flat screw 40 is coupled to the drive motor 32. The flat screw 40 is rotated within the screw case 31 by a rotation drive force generated by the drive motor 32. The drive motor 32 drives the flat screw 40 under the control of the control unit 101.

A groove portion 42 is formed on the lower surface 48 which is a surface of the flat screw 40 intersecting the rotation axis RX. The communication path 22 of the material supply unit 20 communicates with the groove portion 42 from a side surface of the flat screw 40. In the present embodiment, three groove portions 42 are formed by separating with ridge portions 43 as shown in FIG. 2. The number of the groove portions 42 is not limited to three, and may be one, or two or more.

The lower surface 48 of the flat screw 40 faces the upper surface 52 of the screw facing portion 50. A space is formed between the groove portion 42 on the lower surface 48 of the flat screw 40 and the upper surface 52 of the screw facing portion 50. In the shaping unit 110, the raw material MR is supplied from the material supply unit 20 into a material inflow port 44 shown in FIG. 3 in the space between the flat screw 40 and the screw facing portion 50.

A heater 58 that heats the raw material MR supplied into the groove portion 42 of the rotating flat screw 40 is embedded in the screw facing portion 50. A plurality of guide grooves 54 that are coupled to a communication hole 56 and extend spirally from the communication hole 56 towards an outer periphery are formed on the upper surface 52 of the screw facing portion 50. The raw material MR supplied into the groove portion 42 of the flat screw 40 flows along the groove portion 42 by rotation of the flat screw 40 while being melted in the groove portion 42, and the raw material MR is guided to a central portion 46 of the flat screw 40 as a shaping material. The paste-like shaping material that flows into the central portion 46 and exhibits flowability is supplied into the discharge unit 60 via the communication hole 56 provided at a center of the screw facing portion 50 shown in FIG. 3. In the shaping material, not all types of substances that constitute the shaping material may be melted. The shaping material may be converted into a state in which the shaping material has flowability as a whole by melting at least a part of the substances that constitute the shaping material.

The discharge unit 60 includes a nozzle 61 that discharges the shaping material, a shaping material flow path 65 provided between the flat screw 40 and the nozzle 61, and an opening and closing mechanism 70 that opens or closes the flow path 65. The nozzle 61 is coupled to the communication hole 56 of the screw facing portion 50 through the flow path 65. The nozzle 61 discharges the shaping material generated in the shaping material generation unit 30 from a discharge port 62 at a tip end of the nozzle 61 towards the stage 210.

The opening and closing mechanism 70 opens or closes the flow path 65 to control the shaping material flowing out from the nozzle 61. In the first embodiment, the opening and closing mechanism 70 is implemented with a butterfly valve. The opening and closing mechanism 70 includes a drive shaft 72 that is a shaft-shaped member extending in one direction, a valve body 73 that is rotated by rotation of the drive shaft 72, and a valve drive unit 74 that generates a rotation drive force of the drive shaft 72.

The drive shaft 72 is mounted in the middle of the flow path 65 so as to intersect a flow direction of the shaping material. More specifically, the drive shaft 72 is mounted parallel to the Y direction which is a direction perpendicular to the flow direction of the shaping material in the flow path 65. The drive shaft 72 is rotatable around a central axis along the Y direction.

The valve body 73 is a plate-shaped member that is rotated in the flow path 65. In the first embodiment, the valve body 73 is formed by processing a portion of the drive shaft 72 disposed in the flow path 65 into a plate shape. A shape of the valve body 73 as viewed in a direction perpendicular to a plate surface of the valve body 73 substantially coincides with an opening shape of the flow path 65 at a portion where the valve body 73 is disposed.

The valve drive unit 74 rotates the drive shaft 72 under the control of the control unit 101. The valve drive unit 74 is implemented with, for example, a stepping motor. The valve body 73 is rotated in the flow path 65 by rotation of the drive shaft 72.

When a plate surface of the valve body 73 is perpendicular to the flow direction of the shaping material in the flow path 65 (a perpendicular state), the flow path 65 is in a closed state. In this state, the shaping material is blocked from flowing from the flow path 65 into the nozzle 61, and the shaping material is stopped flowing out from the discharge port 62. When the plate surface of the valve body 73 is rotated from the perpendicular state by the rotation of the drive shaft 72, the shaping material is allowed to flow from the flow path 65 to the nozzle 61, and the shaping material with a discharge amount corresponding to a rotation angle of the valve body 73 flows out from the discharge port 62. As shown in FIG. 1, when a direction of the plate surface of the valve body 73 is along the flow direction of the shaping material in the flow path 65, the flow path 65 is fully opened. In this state, the discharge amount of the shaping material from the discharge port 62 per unit time is maximum. In this manner, the opening and closing mechanism 70 can turn on or turn off flowing out of the shaping material and adjust the discharge amount of the shaping material.

The stage 210 is disposed at a position facing the discharge port 62 of the nozzle 61. In the first embodiment, a surface 211 of the stage 210 that faces the discharge port 62 of the nozzle 61 is parallel to the X and Y directions, that is, horizontal directions. In shaping processing, the three-dimensional shaping device 100 shapes a three-dimensional shaped object by discharging the shaping material from the discharge unit 60 towards the surface 211 of the stage 210 to stack a layer, which will be described later.

The moving mechanism 230 changes a relative position between the stage 210 and the nozzle 61. In the first embodiment, a position of the nozzle 61 is fixed, and the moving mechanism 230 moves the stage 210. The moving mechanism 230 includes a three-axis positioner that moves the stage 210 in three axial directions in the X, Y, and Z directions by drive forces of three motors M. The moving mechanism 230 changes a relative positional relationship between the nozzle 61 and the stage 210 under the control of the control unit 101. In the present specification, a movement of the nozzle 61 refers to that the nozzle 61 is moved relative to the stage 210, unless otherwise specified.

Other than a configuration in which the moving mechanism 230 moves the stage 210, other embodiments may include a configuration in which a position of the stage 210 is in a fixed state and the moving mechanism 230 moves the nozzle relative to the stage 210. Alternatively, other embodiments may include a configuration in which the moving mechanism 230 moves the stage 210 in the Z direction and moves the nozzle 61 in the X and Y directions, or a configuration in which the moving mechanism 230 moves the stage 210 in the X and Y directions and moves the nozzle 61 in the Z direction. The relative positional relationship between the nozzle 61 and the stage 210 can also be changed in these configurations.

The control unit 101 is a control device that controls an overall operation of the three-dimensional shaping device 100. The control unit 101 is implemented with a computer including one or a plurality of processors, a main storage device, and an input and output interface that inputs a signal from the outside or outputs a signal to the outside. In addition to a function of serving as a data generation unit 102, the control unit 101 has various functions by the processor executing a program or an instruction that is read on the main storage device. Instead of being implemented with a computer, the control unit 101 may be implemented with a configuration of combining a plurality of circuits in order to implement at least a part of the functions.

The data generation unit 102 generates shaping data that includes a plurality of partial paths used for moving the discharge unit 60 by the moving mechanism 230. The control unit 101 controls the moving mechanism 230 and the shaping unit 110 that includes the opening and closing mechanism 70 and the discharge unit 60 according to the shaping data generated by the data generation unit 102 to shape a three-dimensional shaped object on the stage 210.

The data generation unit 102 generates the shaping data by using shape data such as three-dimensional CAD data that indicates a shape of the three-dimensional shaped object. The shaping data includes a discharge path of the shaping material and discharge control data including a discharge amount of the shaping material by the discharge unit 60. The discharge path of the shaping material is a path in which the nozzle 61 moves relatively along the surface 211 of the stage 210 while discharging the shaping material.

The discharge path includes a plurality of partial paths. Each partial path is a linear path. The discharge control data is respectively associated with each partial path. In the present embodiment, the discharge amount indicated by the discharge control data is an amount of the shaping material discharged per unit time in each partial path. In other embodiments, a total amount of the shaping material discharged in each partial path may be associated with each partial path as the discharge control data.

Figure 4:
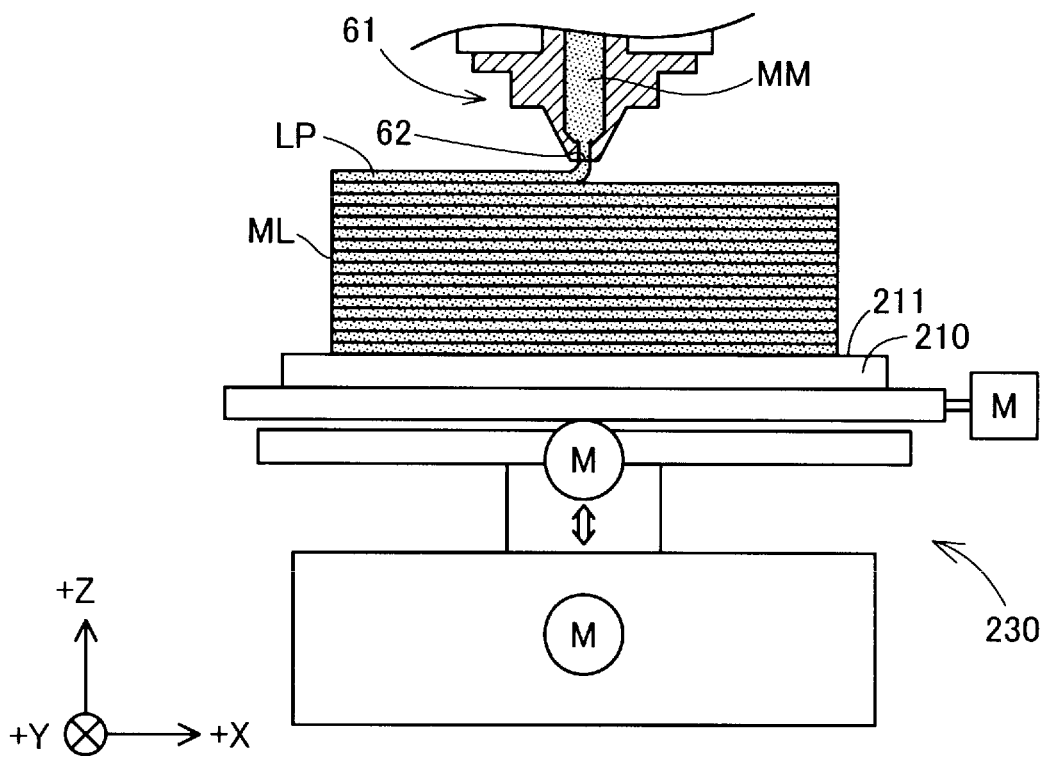
FIG. 4 is a schematic diagram showing a state in which a three-dimensional shaped object is shaped.

FIG. 4 is a schematic diagram showing a state in which a three-dimensional shaped object is shaped in the three-dimensional shaping device 100. In the three-dimensional shaping device 100, as described above, the raw material MR in a solid state that is supplied to the groove portion 42 of the rotating flat screw 40 is melted to generate a shaping material MM in the shaping material generation unit 30. The control unit 101 maintains a distance between the surface 211 of the stage 210 and the nozzle 61, and discharges the shaping material MM from the nozzle 61 while changing the position of the nozzle 61 relative to the stage 210 in a direction along the surface 211 of the stage 210. The shaping material MM discharged from the nozzle 61 is continuously stacked in a moving direction of the nozzle 61. A linear portion LP which is a shaping portion extending linearly along a scanning path of the nozzle 61 is shaped by scanning with the nozzle 61.

The control unit 101 repeats the scanning with the nozzle 61 to form layers ML. After forming one layer ML, the control unit 101 moves the position of the nozzle 61 relative to the stage 210 in the Z direction. Then, a three-dimensional shaped object is shaped by further stacking a layer ML on the layers ML that are formed so far.

For example, the control unit 101 may temporarily suspend discharging of the shaping material from the nozzle 61 when the nozzle 61 is moved in the Z direction in a case where one layer ML is completed, or when there are a plurality of independent shaping areas in each layer. In this case, the flow path 65 is closed by the valve body 73 of the opening and closing mechanism 70 and the discharging of the shaping material MM from the discharge port 62 is stopped. After the control unit 101 changes the position of the nozzle 61, the valve body 73 of the opening and closing mechanism 70 opens the flow path 65 to restart stacking the shaping material MM from a changed position of the nozzle 61. According to the three-dimensional shaping device 100, the opening and closing mechanism 70 can easily control a stacking position of the shaping material MM by the nozzle 61.

Figure 5:
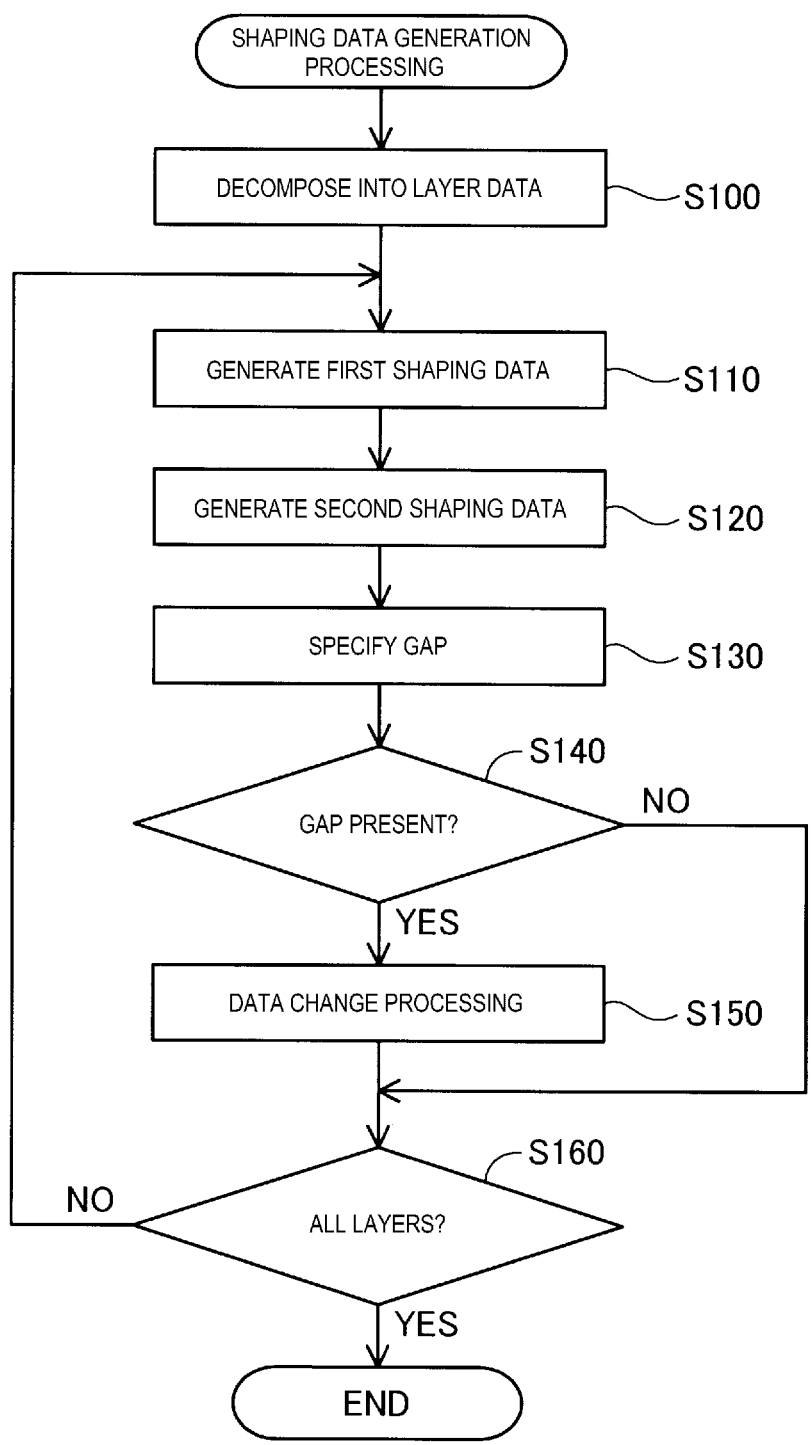
FIG. 5 is a flowchart of shaping data generation processing.
Figure 6:
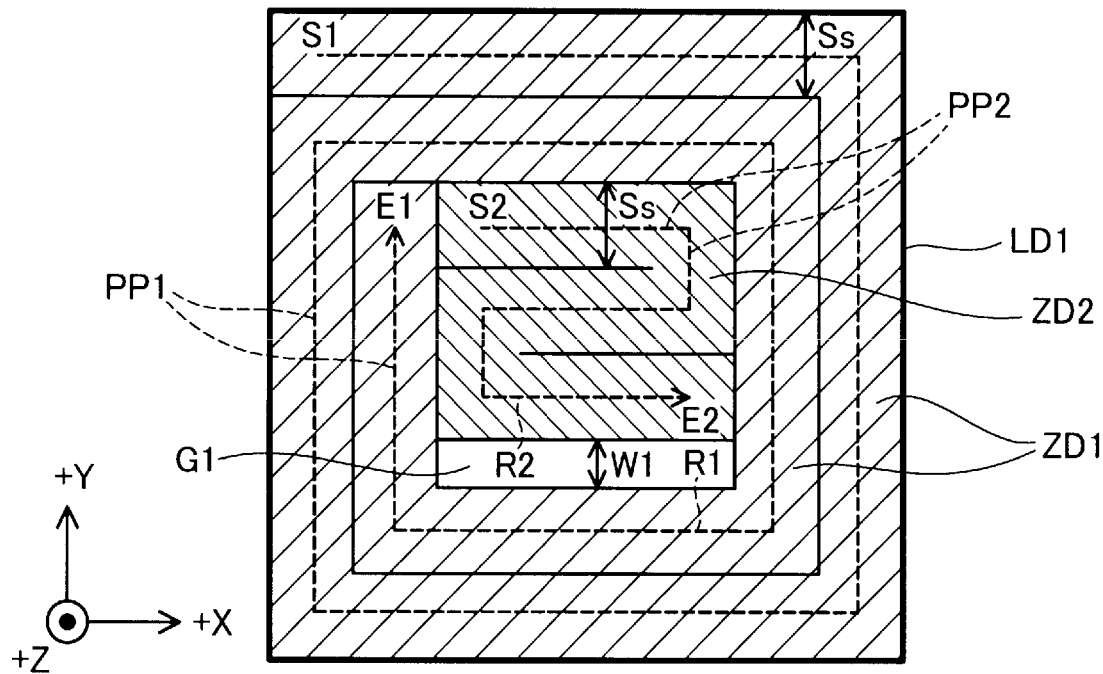
FIG. 6 is a diagram showing an example of a plane shape of one layer of the three-dimensional shaped object.
Figure 7:
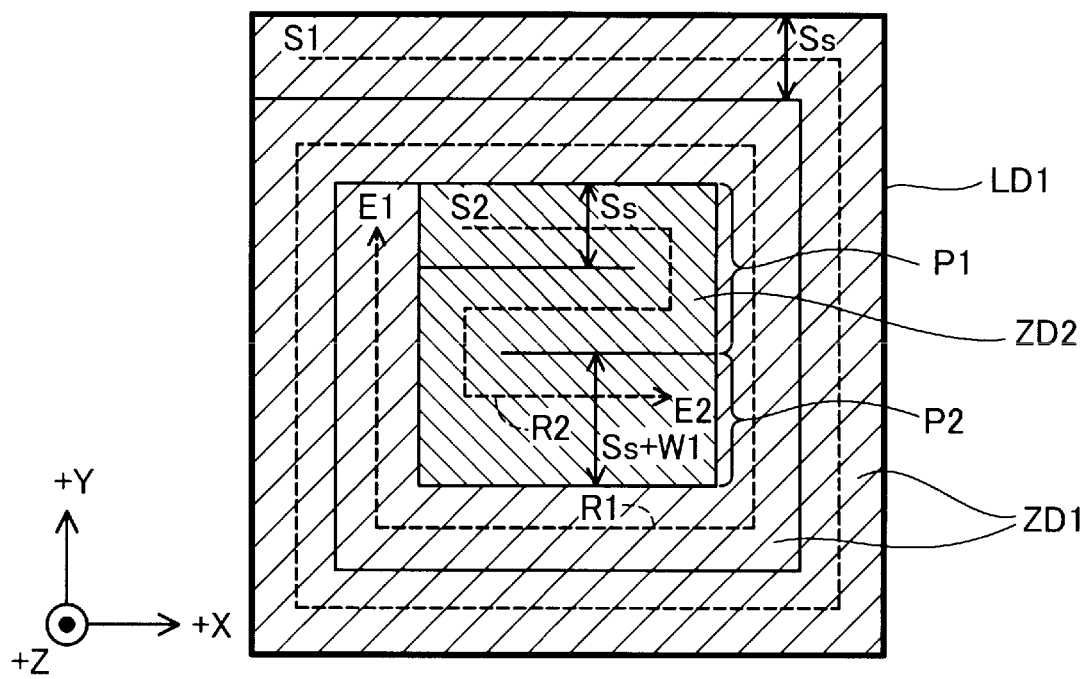
FIG. 7 is a diagram showing an example of a plane shape of one layer of the three-dimensional shaped object.

FIG. 5 is a flowchart of shaping data generation processing performed by the control unit 101. The shaping data generation processing is processing for generating shaping data to be used for shaping the three-dimensional shaped object before shaping the three-dimensional shaped object. FIGS. 6 and 7 are diagrams showing examples of a plane shape of one layer of the three-dimensional shaped object.

As shown in FIG. 5, in step S100, the data generation unit 102 analyzes three-dimensional CAD data which is shaping data of a three-dimensional shaped object and is input from the outside, and generates layer data obtained by slicing the three-dimensional shaped object into a plurality of layers along an XY plane. The layer data is data indicating an outer shell of the three-dimensional shaped object in the XY plane. FIG. 6 shows an example by a thick line in which a rectangular outer shell is indicated by layer data LD1.

In step S110, the data generation unit 102 generates first shaping data. The first shaping data is data for forming an outer shell area that is in contact with an inner side of the outer shell indicated by the layer data. The outer shell area is an area that affects an appearance of the three-dimensional shaped object. The first shaping data includes a path for shaping an outermost periphery along the outer shell of the three-dimensional shaped object. The first shaping data may include not only a discharge path for shaping the outermost periphery of the three-dimensional shaped object but also a discharge path including one round inside the outermost periphery. The number of turns of the discharge path for forming the outer shell area may be set to any number.

FIG. 6 shows an example in which first shaping data ZD1 includes a discharge path at an outermost side and a discharge path at one round inside the outermost side. These discharge paths include a plurality of partial paths PP1 for shaping the outer shell area. As described above, each partial path PP1 is a linear path. Therefore, the first shaping data ZD1 is indicated by eight continuous partial paths PP1 that are indicated by broken lines from a start point indicated by "S1" to a position indicated by "E1" of the inner discharge path in FIG. 6. Discharge amounts are respectively associated with the partial paths PP1 as discharge control data. The discharge amount is an amount at which the shaping material stacked on the stage 210 is a predetermined reference width Ss. In FIG. 6, the outermost discharge path and the inner discharge path are continuous paths. Alternatively, the outermost discharge path and the inner discharge path may be separate paths. That is, an end point of the outermost discharge path may be different from a start point of the inner discharge path.

The data generation unit 102 generates second shaping data in step S120. The second shaping data is data for shaping an inner area that is an area inside the outer shell indicated by the layer data other than the outer shell area. The inner area has a larger influence on strength of the three-dimensional shaped object than on the appearance of the three-dimensional shaped object.

FIG. 6 shows an example in which second shaping data ZD2 is indicated by an S-shaped meandering discharge path. The data generation unit 102 generates, as the second shaping data ZD2, a discharge path that covers the inner area by reciprocatedly moving the discharge unit 60 along a predetermined reference direction and gradually moving the discharge unit 60 in a direction orthogonal to the reference direction in the XY plane. The discharge path that covers the inner area includes a plurality of partial paths PP2. As described above, each partial path PP2 is a linear path. Accordingly, the second shaping data ZD2 is indicated by five partial paths PP2 from a start point indicated by "S2" to an end point indicated by "E2" in FIG. 6. Discharge amounts are respectively associated with the partial paths PP2 as discharge control data. The discharge amount is an amount at which the shaping material stacked on the stage 210 is the predetermined reference width Ss. Both a width of a path shaped by the first shaping data ZD1 and a width of a path shaped by the second shaping data ZD2 are the reference width Ss in the present embodiment. Alternatively, the width of the path shaped by the first shaping data ZD1 and the width of the path shaped by the second shaping data ZD2 may be different widths.

The end point "E1" of the discharge path indicated by the first shaping data ZD1 and the start point "S2" of the discharge path indicated by the second shaping data ZD2 are shown at different positions for illustration in FIG. 6. The endpoint "E1" and the start point "S2" are in fact at the same position. Therefore, the discharge path indicated by the first shaping data ZD1 and the discharge path indicated by the second shaping data ZD2 are continuously coupled.

Alternatively, the discharge paths may be discontinuous paths in other embodiments. That is, the end point "E1" of the discharge path indicated by the first shaping data ZD1 and the start point "S2" of the discharge path indicated by the second shaping data ZD2 may be at different positions.

Hereinafter, the first shaping data generated in step S110 and the second shaping data generated in step S120 are collectively referred to as "intermediate data". The intermediate data includes path data that indicates, by a plurality of partial paths, a path through which the discharge unit 60 discharges the shaping material while being moved, and the discharge control data including discharge amount information that indicates a discharge amount of the shaping material in each partial path.

In step S130, the data generation unit 102 analyzes the intermediate data to specify a gap portion interposed between a first partial path and a second partial path. The second partial path is a path through which the shaping material is discharged from the discharge unit 60 later than through the first partial path. FIG. 6 shows an example in which a gap portion G1 having a width W1 is specified along and between a first partial path R1 included in the first shaping data ZD1 and a second partial path R2 included in the second shaping data ZD2. The width W1 of the gap portion G1 is smaller than the reference width Ss described above. That is, a gap having a width smaller than the reference width Ss is generated between the first partial path and the second partial path.

In step S140, the data generation unit 102 determines whether the gap portion is specified in step S130. If the gap portion is specified, the data generation unit 102 performs data change processing to cover the gap portion in step S150. If the gap portion is not specified, the data generation unit 102 skips the data change processing. When the data change processing is performed, the above-described intermediate data is changed to generate shaping data. On the other hand, when the data change processing is not performed, the above-described intermediate data is used as the shaping data.

In the data change processing in step S150, the data generation unit 102 generates the shaping data from the intermediate data by only changing the discharge control data corresponding to the second partial path so as to increase, in the second partial path through which the shaping material is discharged later between the first partial path and the second partial path that sandwich the gap portion, a width of the shaping material stacked on the stage 210 or on the layer that is previously formed. In the present embodiment, the data generation unit 102 increases the width of the shaping material stacked in the second partial path by increasing the discharge amount that is indicated by the discharge control data associated with the second partial path. In the example shown in FIG. 6, the data generation unit 102 increases the discharge amount so as to increase the width of the shaping material in the second partial path R2 through which the shaping material is discharged later among the first partial path R1 and the second partial path R2 that sandwich the gap portion G1, as shown in FIG. 7, from the reference width Ss to a width obtained by adding the width W1 of the gap portion to the reference width Ss. In the present embodiment, the data generation unit 102 generates the shaping data in step S150 such that the discharge path indicated by the first shaping data ZD1 for shaping the outer shell area and the discharge path indicated by the second shaping data ZD2 for shaping the inner area are continuous paths.

In step S160, the data generation unit 102 determines whether the above processing is completed for all layer data. If the processing is not completed for all layer data, the data generation unit 102 repeats the processing from step S110 to step S150 for subsequent layer data. When generation of shaping data is completed for all layer data, the data generation unit 102 ends the shaping data generation processing. It should be noted that step S110 and step S120 in the shaping data generation processing described above are also referred to as a first step in the three-dimensional shaped object manufacturing method, step S130 is also referred to as a second step in the method, and step S150 is also referred to as a third step in the method.

Figure 8:
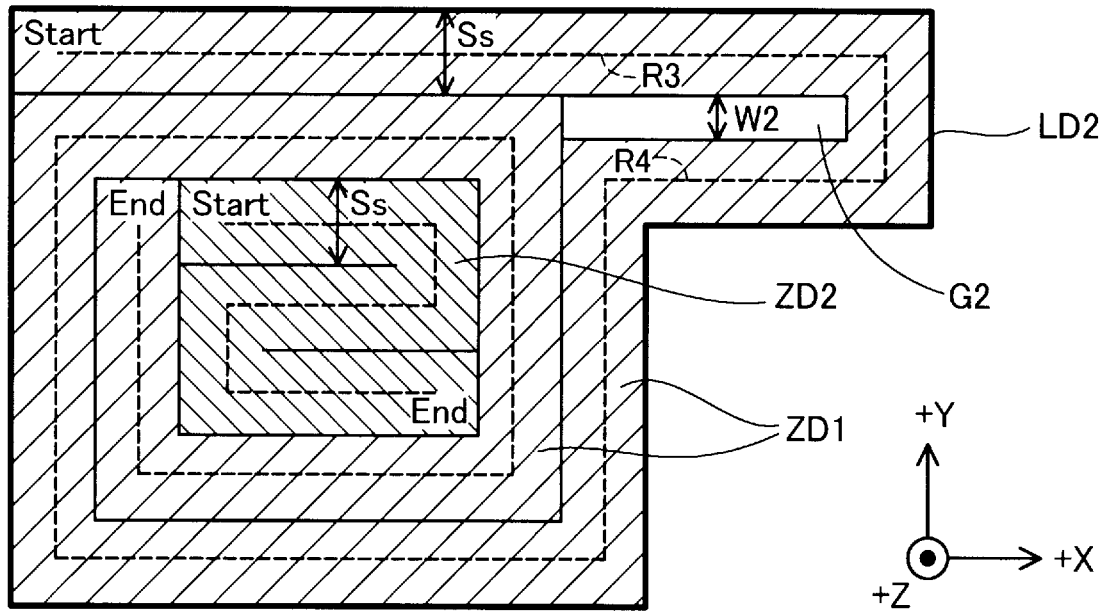
FIG. 8 is a diagram showing another example of a plane shape of one layer of the three-dimensional shaped object.
Figure 9:
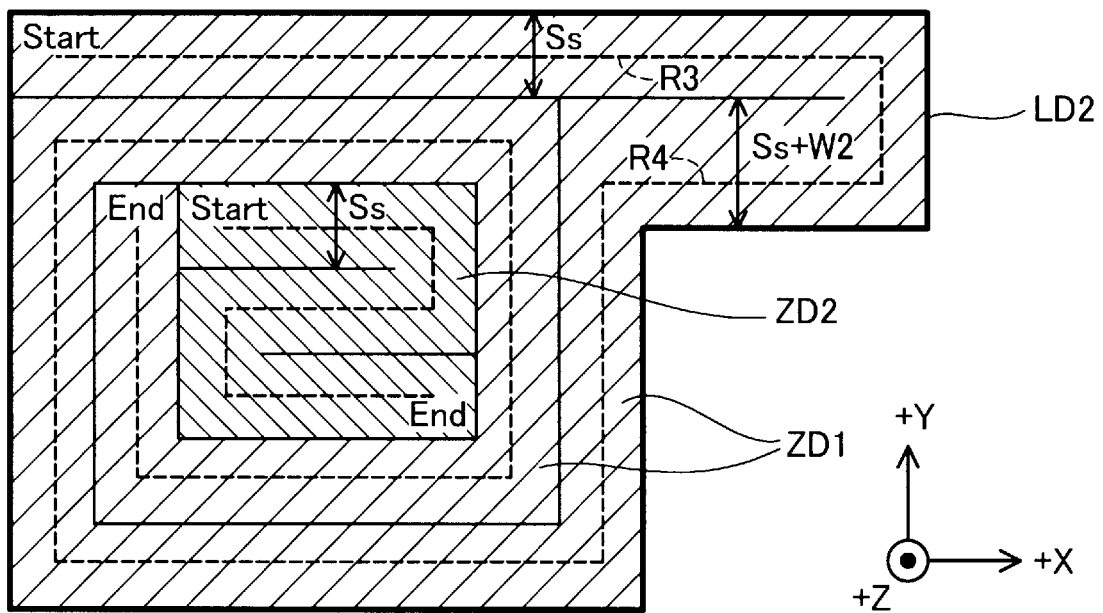
FIG. 9 is a diagram showing another example of a plane shape of one layer of the three-dimensional shaped object.

FIGS. 8 and 9 are diagrams showing another example of a plane shape of one layer of the three-dimensional shaped object. FIGS. 8 and 9 show an example in which the outer shell including a portion protruding outwardly is indicated by layer data LD2. FIG. 8 shows an example in which a gap portion G2 is specified between two partial paths R3 and R4 included in the first shaping data ZD1 in the layer data LD2. In this case, as shown in FIG. 9, the shaping data is changed so as to increase a width of the shaping material stacked on the stage 210 in the partial path R4 through which the shaping material is discharged later between the two partial paths R3 and R4 included in the first shaping data ZD1 in step S150. The changed width of the partial path R4 is obtained by adding a width W2 of the gap portion G2 to the reference width Ss which is an original width of the partial path R4. In step S150, when the gap portion is specified between the two partial paths included in the second shaping data ZD2, the shaping data is changed so as to increase the width of the shaping material stacked on the stage 210 in the partial path through which the shaping material is discharged later among the two partial paths.

Figure 10:
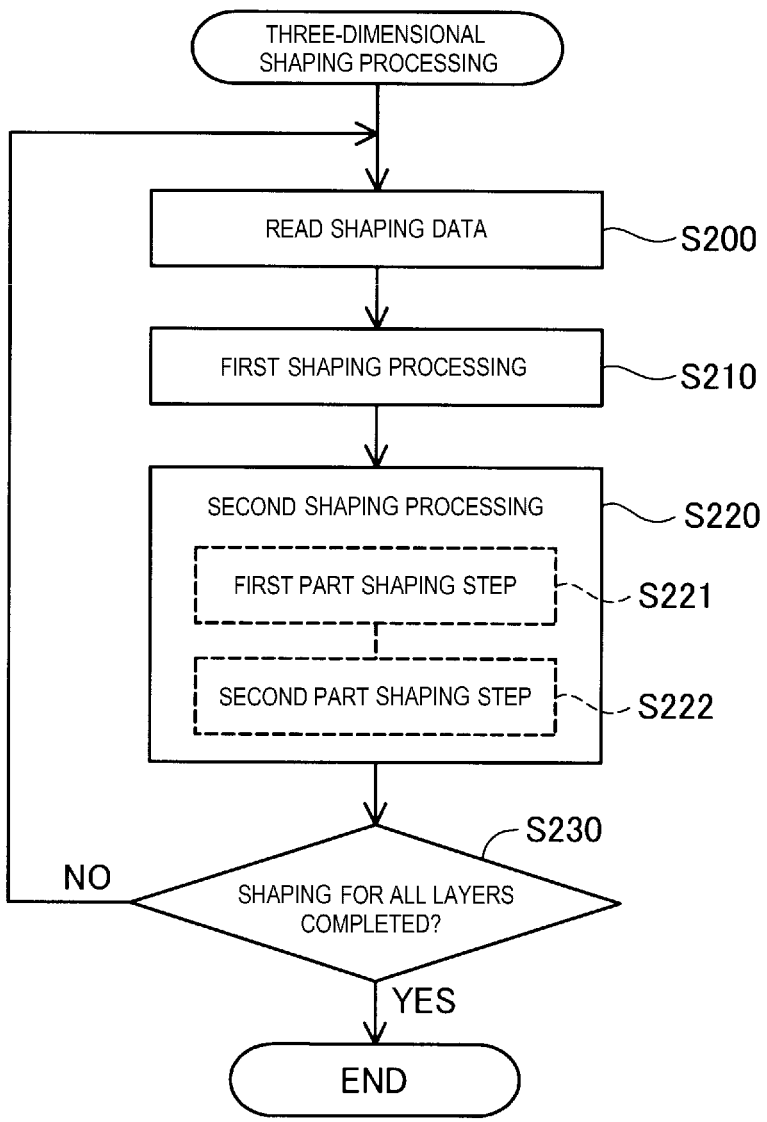
FIG. 10 is a flowchart of three-dimensional shaping processing.

FIG. 10 is a flowchart of three-dimensional shaping processing performed by the control unit 101. The three-dimensional shaping processing shown in FIG. 10 is performed by the control unit 101 using the shaping data generated in the shaping data generation processing shown in FIG. 5. The three-dimensional shaping device 100 implements the three-dimensional shaped object manufacturing method by performing the shaping data generation processing shown in FIG. 5 and the three-dimensional shaping processing shown in FIG. 10.

In step S200, the control unit 101 reads shaping data of one of a plurality of layers that form the three-dimensional shaped object. The shaping data includes the first shaping data and the second shaping data as described above. In the present embodiment, the control unit 101 first reads shaping data in a lowermost layer in the gravity direction among the plurality of layers that form the three-dimensional shaped object.

In step S210, the control unit 101 performs first shaping processing. In the first shaping processing, the control unit 101 controls the moving mechanism 230 and the discharge unit 60 to form an outer shell area in a current layer in accordance with partial paths included in the first shaping data and discharge control data associated with each partial path.

In step S220, the control unit 101 performs second shaping processing. In the second shaping processing, the control unit 101 controls the moving mechanism 230 and the discharge unit 60 to form an inner area in the current layer in accordance with partial paths included in the second shaping data and discharge control data associated with each partial path.

In the second shaping processing in the examples of the shaping data shown in FIGS. 6 and 7, the discharge unit 60 is moved on the stage 210 such that an interval between adjacent stacked shaping materials is a first interval and the shaping material is discharged from the discharge unit 60 to perform a first part shaping step S221 in which a first part P1 in the three-dimensional shaped object is shaped. In the examples in FIGS. 6 and 7, the first interval is the same as the reference width Ss. Then, the shaping material is discharged from the discharge unit 60 so as to increase the width of the shaping material stacked on the stage 210 or on the layer that is previously formed from the width Ss of the shaping material stacked on the stage 210 or on the layer that is previously formed in the first part shaping step S221 to a width (Ss+W1). A second part shaping step S222 is performed to shape a second part P2 of the three-dimensional shaped object other than the first part P1 such that the second part P2 is in contact with the first part P1 as shown in FIG. 7.

In step S230, the control unit 101 determines whether shaping is completed for all layers. If the shaping is not completed for all layers, the control unit 101 repeats the processing of step S210 and step S220 in a subsequent layer, that is, a layer adjacent to an upper side of the current layer in the gravity direction. In step S210, the control unit 101 controls the moving mechanism 230 to lift a position of the nozzle 61 by one layer from the stage 210 before the shaping material is discharged from the discharge unit 60. When the shaping is completed for all layers, the control unit 101 ends the three-dimensional shaping processing. It should be noted that step S210 and step S220 in the three-dimensional shaping processing described above are also referred to as a fourth step in the three-dimensional shaped object manufacturing method.

According to the three-dimensional shaping device 100 in the present embodiment described above, even when the gap portion is interposed between the first partial path and the second partial path, since the shaping data is generated such that the width of the shaping material stacked in the second partial path is increased, the discharge unit 60 does not need to be moved from a position away from the gap portion to the gap portion in order to cover the gap portion during shaping the three-dimensional shaped object. Therefore, shaping accuracy of the three-dimensional shaped object can be prevented from lowering due to the shaping material sagging from the discharge unit 60. In particular, in the present embodiment, since the width of the shaping material stacked on the stage 210 is increased in the second partial path through which the shaping material is discharged later among the first partial path and the second partial path, the gap portion can be covered by the shaping material after a partial path that is formed before the increase of the width is hardened to a certain extent. Therefore, the shaping material can be prevented from flowing out unintentionally, and shaping accuracy of the three-dimensional shaped object can be improved.

In the present embodiment, since a part of an existing partial path is thickened, it is not necessary to add a new partial path to cover the gap portion. Therefore, the shaping data can be prevented from increasing. Since it is not necessary to perform shaping with a narrow line width to cover a narrow gap portion, a gap can be easily covered.

The shaping data used in the present embodiment includes information indicating the discharge amount of the shaping material in each partial path. Therefore, the width of the shaping material stacked on the stage 210 can be easily increased by increasing the discharge amount of the shaping material associated with the second partial path.

In the present embodiment, the shaping data is divided into the first shaping data for shaping the outer shell area and the second shaping data for shaping the inner area, and the outer shell area is shaped earlier than the inner area. Therefore, even when the gap portion is specified between the inner area and the outer shell area as shown in FIG. 6, the gap portion can be covered after the outer shell area which has a large influence on appearance is formed. Therefore, shaping accuracy of the three-dimensional shaped object can be improved.

In the present embodiment, since the shaping path for shaping the outer shell area and the shaping path for shaping the inner area are continuous, the inner area and the outer shell area can be continuously shaped. Therefore, when the discharge unit 60 moves between the inner area and the outer shell area, the shaping material does not sag from the discharge unit 60. Therefore, shaping accuracy of the three-dimensional shaped object can be prevented from lowering.

B. Second Embodiment

Figure 11:
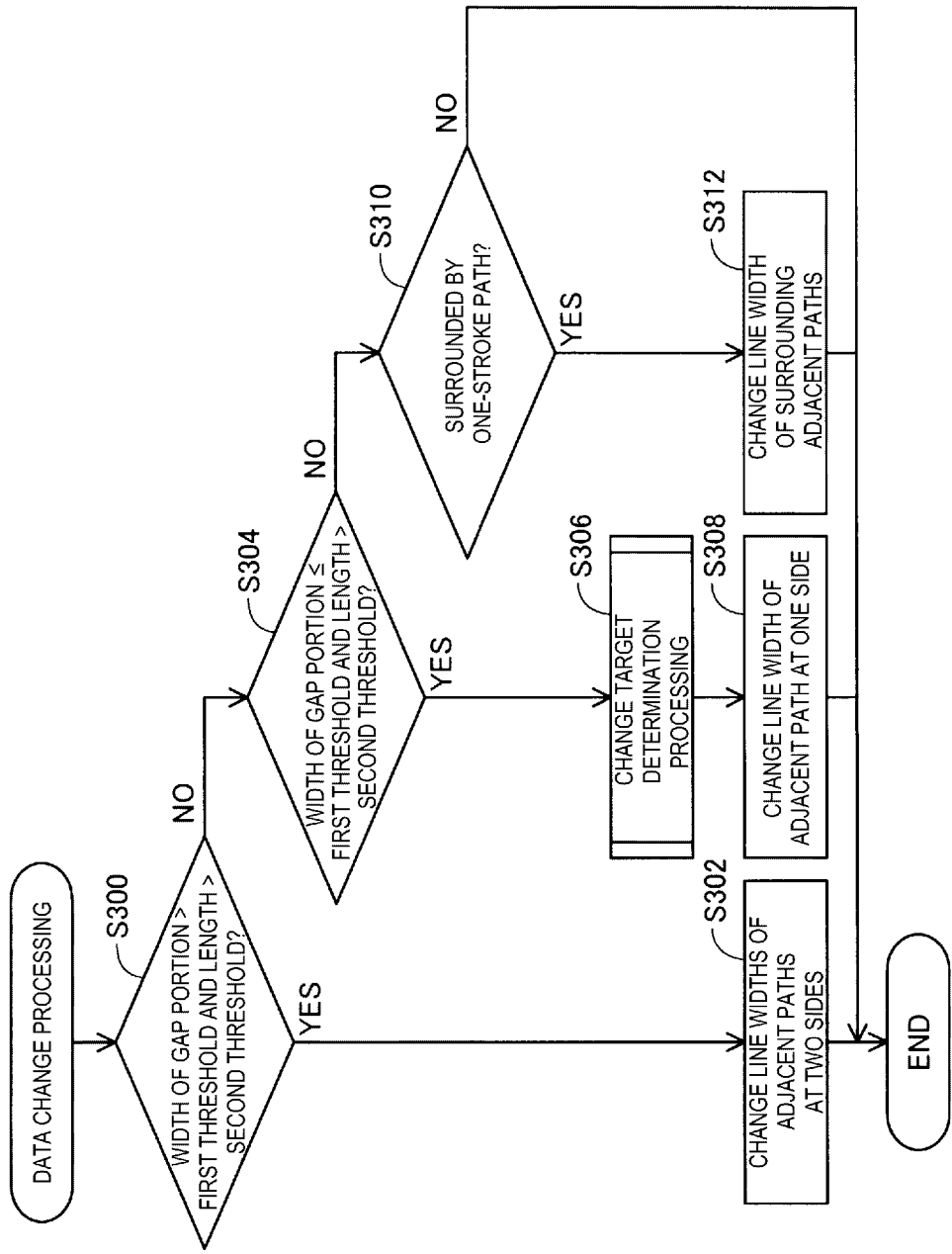
FIG. 11 is a flowchart of data change processing according to a second embodiment.

FIG. 11 is a flowchart of data change processing according to the second embodiment. This data change processing is performed to replace the data change processing in step S150 shown in FIG. 5. A configuration of the three-dimensional shaping device 100 in the second embodiment is the same as a configuration of the three-dimensional shaping device 100 in the first embodiment. Hereinafter, a partial path is referred to as a "path" and a path adjacent to a gap portion is referred to as an "adjacent path". Hereinafter, a width of a shaping material stacked on the stage 210 along the XY direction is referred to as a "line width". Hereinafter, the data change processing shown in FIG. 11 will be described with reference to results of the data change processing shown in FIGS. 12 to 14.

Figure 12:
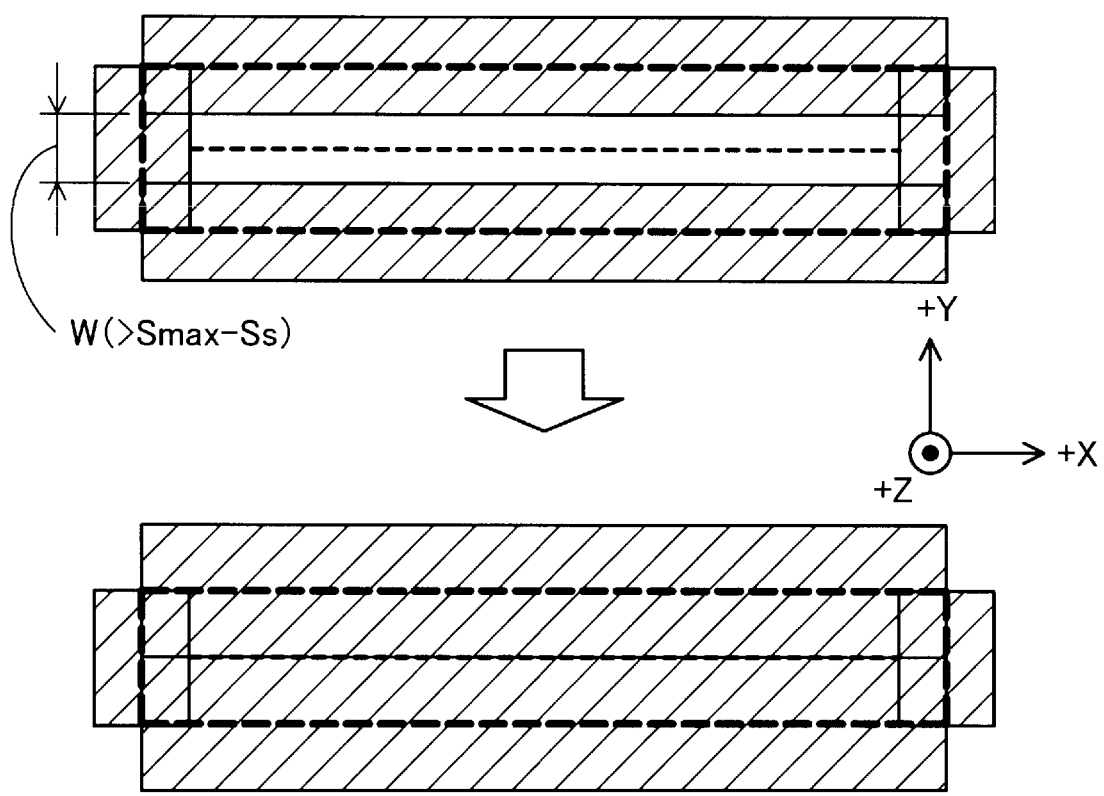
FIG. 12 is a diagram showing a result of the data change processing.

In step S300, the data generation unit 102 determines whether a width of the gap portion is larger than a predetermined first threshold and a length of the gap portion is larger than a predetermined second threshold. The length of the gap portion is a dimension along a longitudinal direction of the gap portion, and the width of the gap portion is a dimension along a direction perpendicular to the longitudinal direction of the gap portion. When the width of the gap portion is larger than the first threshold and the length of the gap portion is larger than the second threshold, as shown in FIG. 12, the data generation unit 102 increases line widths of adjacent paths at two sides of the gap portion in step S302. That is, in addition to the second partial path, a line width of the first partial path is also increased in step S302.

The first threshold is a difference between a maximum width Smax of a shaping material that can be stacked on the stage in each path under the control of the opening and closing mechanism 70 and the reference width Ss of the shaping material stacked on the stage in each path, that is, Smax−Ss. That is, when a relationship of W>Smax−Ss in which W is a width of the gap portion is satisfied, it is determined that the width of the gap portion is larger than the predetermined first threshold. The reference width Ss is a line width smaller than the maximum width Smax. The reference width Ss can be set to any number. For example, the reference width Ss can be set to 60% to 80% of the maximum width Smax. The reference width Ss is preferably larger than a half of the maximum width Smax.

When the width W of the gap portion is larger than the first threshold, even if the line width is increased to the maximum width Smax by adjusting the discharge amount by the opening and closing mechanism 70, the gap portion cannot be covered with only a path at one side adjacent to the gap portion. Therefore, in step S302, the data generation unit 102 changes discharge control data corresponding to the first partial path and the second partial path so as to increase the width of the shaping material stacked on the stage 210 or on the layer that is previously formed in both the first partial path and the second partial path to cover the gap portion by increasing line widths of the adjacent paths at two sides of the gap portion, and ends the data change processing. The second threshold is equal to or larger than the first threshold.

When it is not determined in step S300 that the width of the gap portion is larger than the first threshold and the length of the gap portion is larger than the second threshold, the data generation unit 102 determines whether the width of the gap portion is equal to or less than the first threshold and the length of the gap portion is larger than the second threshold in step S304. The width of the gap portion is equal to or less than the first threshold refers to that a relationship of W≤Smax−Ss is satisfied. When the width of the gap portion is equal to or less than the first threshold and the length of the gap portion is larger than the second threshold, the data generation unit 102 performs change target determination processing in step S306. The change target determination processing is a processing for determining an adjacent path whose line width is changed. Details of the change target determination processing will be described later.

Figure 13:
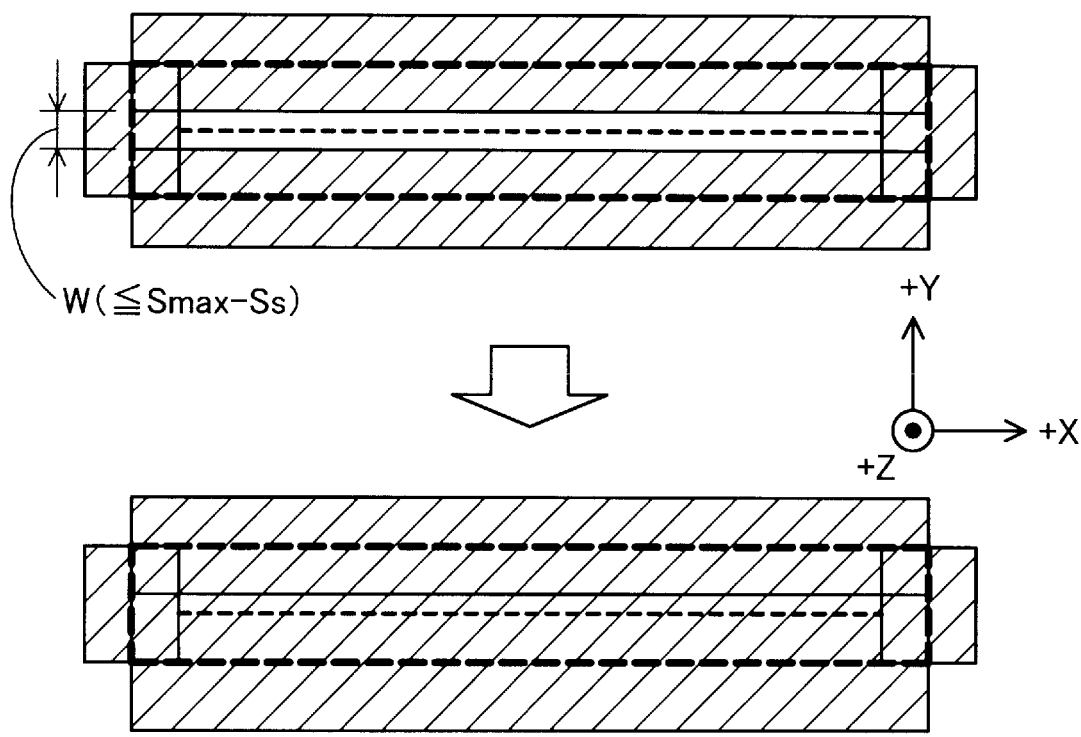
FIG. 13 is a diagram showing a result of the data change processing.

In step S308, the data generation unit 102 increases a line width of the adjacent path determined in step S306 to cover the gap portion, and ends the data change processing. As shown in FIG. 13, step S308 is different from step S302 in that a line width of only an adjacent path at one side is changed instead of changing line widths of the adjacent paths at two sides. If the width of the gap portion is smaller than the first threshold, the opening and closing mechanism 70 adjusts a discharge amount to adjust the line width to the maximum width Smax, so that the gap portion can be covered.

Figure 14:
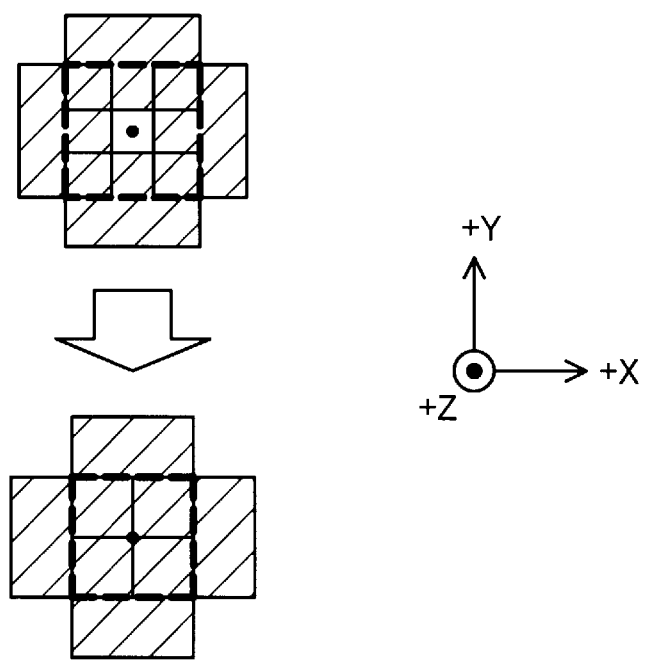
FIG. 14 is a diagram showing a result of the data change processing.

In step S304, when it is not determined that the width of the gap portion is equal to or less than the first threshold and the length of the gap portion is larger than the second threshold, that is, when the length of the gap portion is equal to or less than the second threshold regardless of the magnitude of the width of the gap portion, the data generation unit 102 determines whether the gap portion is surrounded by a one-stroke path in step S310. The one-stroke path surrounds the gap portion with a plurality of continuous paths. When the gap portion is surrounded by the one-stroke path, as shown in FIG. 14, the data generation unit 102 covers the gap portion by increasing line widths of surrounding adjacent paths that surround the gap portion, that is, all paths that form the one-stroke path, and ends the data change processing.

When it is determined in step S310 that the gap portion is not surrounded by the one-stroke path, the data generation unit 102 does not change the line widths of the adjacent paths. This is because the gap portion in this case can be considered to be an extremely small area.

Processing in step S310 and step S312 described above may be omitted in the present embodiment. In this case, when it is not determined in step S304 that the width of the gap portion is equal to or less than the first threshold and the length of the gap portion is larger than the second threshold, the data generation unit 102 does not change the line widths of the adjacent paths and ends the data change processing.

The length of the gap portion is compared with the second threshold in step S300 described above. Alternatively, the comparison between the length of the gap portion and the second threshold may be omitted in step S300. That is, a conditional branch may be determined in step S300 based only on a comparison between the width of the gap portion and the first threshold. In this case, processing in step S304, step S310, and step S312 is omitted, and when it is determined that the width of the gap portion is equal to or less than the first threshold in step S300, the change target determination processing in step S306 may be performed.

Figure 15:
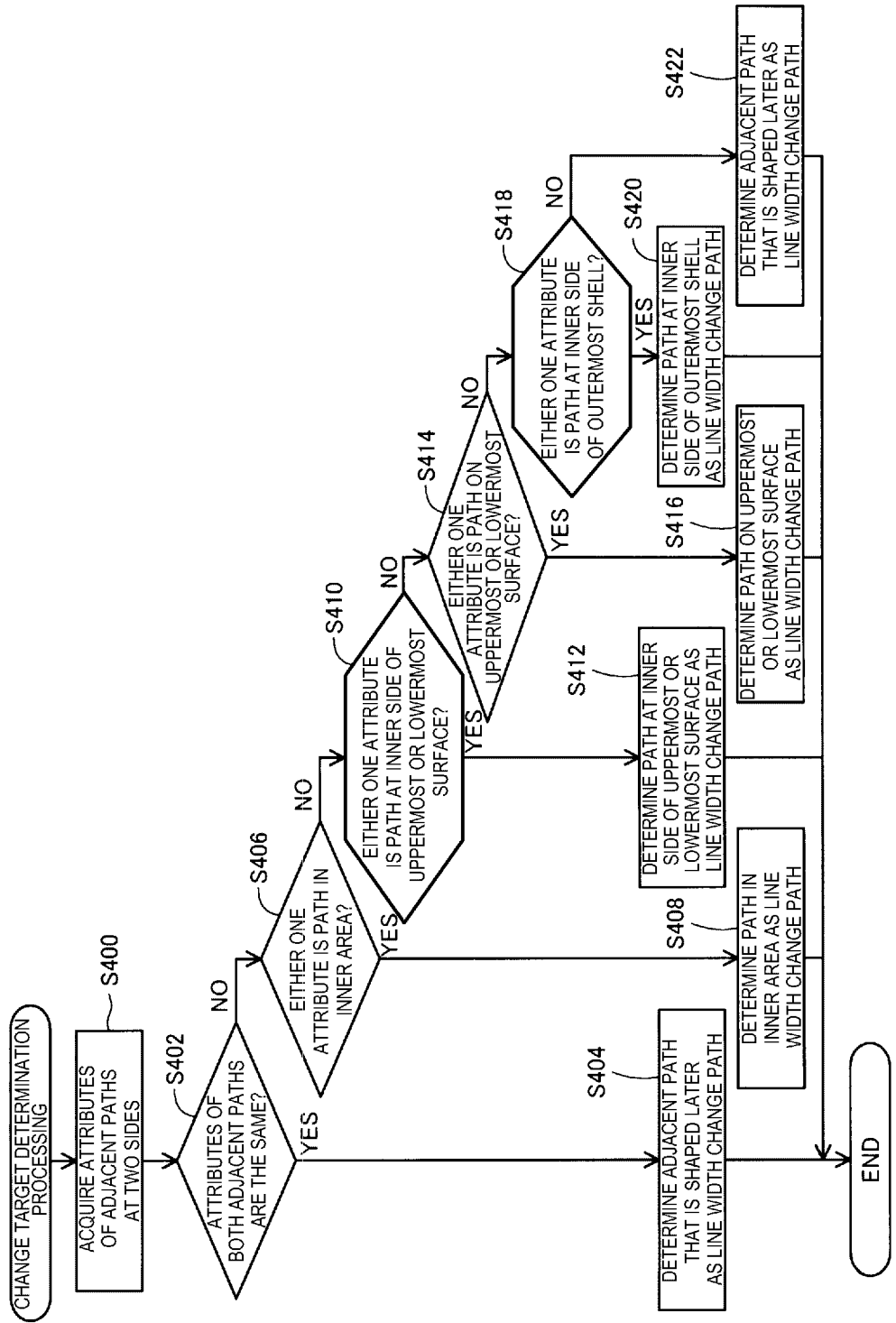
FIG. 15 is a flowchart of change target determination processing.

FIG. 15 is a detailed flowchart of the change target determination processing performed in step S306 in FIG. 11. In step S400, the data generation unit 102 acquires attributes of the adjacent paths at two sides of the gap portion. The attributes are information indicating positions where shaping is performed according to the paths in the three-dimensional shaped object. In the present embodiment, the paths are associated with attributes of an "inner area", an "uppermost or lowermost surface", an "inner side of uppermost or lowermost surface", an "outermost shell", and an "inner side of outermost shell" in first shaping data generation processing and second shaping data generation processing in the shaping data generation processing shown in FIG. 5. The data generation unit 102 can associate the attributes with the paths by analyzing three-dimensional CAD data. The "inner side of uppermost or lowermost surface" refers to a position adjacent to a lower side of an uppermost surface or a position adjacent to an upper side of a lowermost surface in the Z direction. The "inner side of the outermost shell" refers to a position adjacent to an inner side of the outermost shell in the X direction or the Y direction.

In step S402, the data generation unit 102 determines whether the attributes of two adjacent paths acquired in step S400 are the same. If the attributes of both adjacent paths are the same, the data generation unit 102 determines, in step S404, an adjacent path that is shaped later among the two adjacent paths as a target path whose line width is to be changed. Hereinafter, the target path whose line width is to be changed is referred to as a "line width change path".

When it is determined in step S402 that the attributes of the two paths acquired in step S400 are not the same, the data generation unit 102 determines whether one of the attributes is the inner area in step S406. If either one of the attributes is the inner area, the data generation unit 102 determines a path in the inner area as the line width change path in step S408.

When it is determined in step S406 that neither one of the attributes is the inner area, the data generation unit 102 determines whether either one of the attributes is the inner side of the uppermost or lowermost surface in step S410. If either one of the attributes is the inner side of the uppermost or lowermost surface, the data generation unit 102 determines a path at the inner side of the uppermost or lowermost surface as the line width change path in step S412.

When it is determined in step S410 that neither one of the attributes is the inner side of the uppermost or lowermost surface, the data generation unit 102 determines whether either one of the attributes is the uppermost or lowermost surface in step S414. If either one of the attributes is the uppermost or lowermost surface, the data generation unit 102 determines a path on the uppermost or lowermost surface as the line width change path in step S416.

When it is determined in step S414 that neither one of the attributes is the uppermost or lowermost surface, the data generation unit 102 determines whether either one of the attributes is a path at the inner side of the outermost shell in step S418. If either one of the attributes is the path at the inner side of the outermost shell, the data generation unit 102 determines the path at the inner side of the outermost shell as the line width change path in step S420.

When it is determined in step S418 that neither one of the attributes is the path at the inner side of the outermost shell, that is, when it is determined that either one of the attributes is a path on the outermost shell, the data generation unit 102 determines the adjacent path that is shaped later as the line width change path in step S422.

According to the change target determination processing described above, an attribute of an adjacent path has a priority of changing a line width that rises in an order of the outermost shell, the inner side of the outermost shell, the uppermost or lowermost surface, the inner side of the uppermost or lowermost surface, and the inner area. That is, a path that is less likely to affect the appearance and that is shaped later is likely to be preferentially determined as the line width change path. Therefore, a change in an appearance shape along with an increase in a line width can be effectively prevented.

According to the second embodiment described above, a path whose line width is to be changed can be specified according to a width or a length of the gap portion. In addition, when a line width of an adjacent path at one side is increased, it is possible to determine the adjacent path whose line width is to be changed according to an attribute of a path adjacent to the gap portion. Therefore, shaping accuracy of the three-dimensional shaping device 100 can be improved. In the change target determination processing in step S306 in FIG. 11 as described above, the line width change path is determined according to the attributes of the adjacent paths by performing the processing shown in FIG. 15. Alternatively, the adjacent path that is shaped later may be uniformly determined as the line width change path among the two paths adjacent to the gap portion.

C. Third Embodiment

Figure 16:
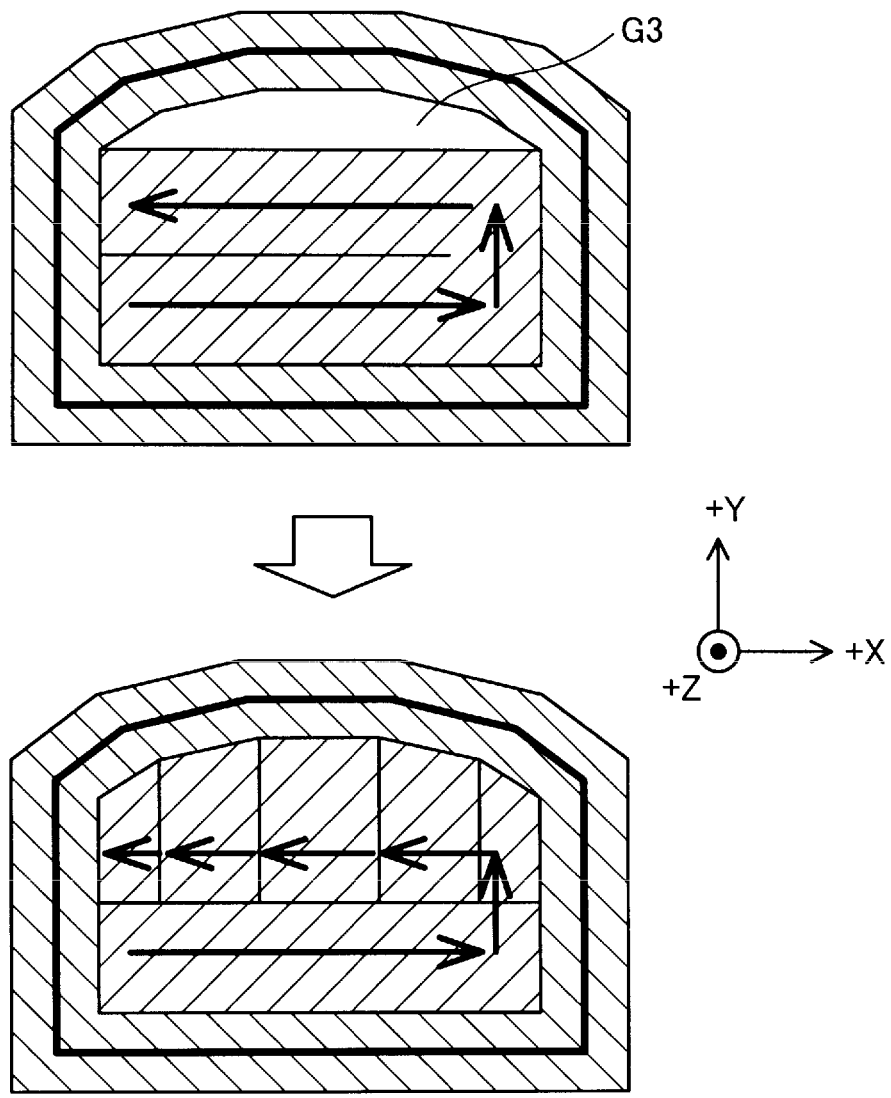
FIG. 16 is a diagram showing data change processing according to a third embodiment.

FIG. 16 is a diagram showing data change processing according to the third embodiment. An upper side of FIG. 16 shows an example in which a gap portion G3 that has an arc-shaped outer peripheral shape and that has a width changing in a length direction is specified in step S130 in the shaping data generation processing shown in FIG. 5. In this manner, when the gap portion whose width is to be changed is specified, the data generation unit 102 generates shaping data so as to change a width of a shaping material stacked on the stage 210 or on the layer that is previously formed in the second partial path in accordance with the width change of the gap portion. Specifically, in the present embodiment, the second partial path adjacent to the gap portion is divided into a plurality of partial paths, and a line width of each divided partial path is increased so as to change the line width of each divided partial path in accordance with the width change of the gap portion. In this manner, the gap portion can be effectively covered and shaping accuracy can be improved by changing the shaping data.

Figure 17:
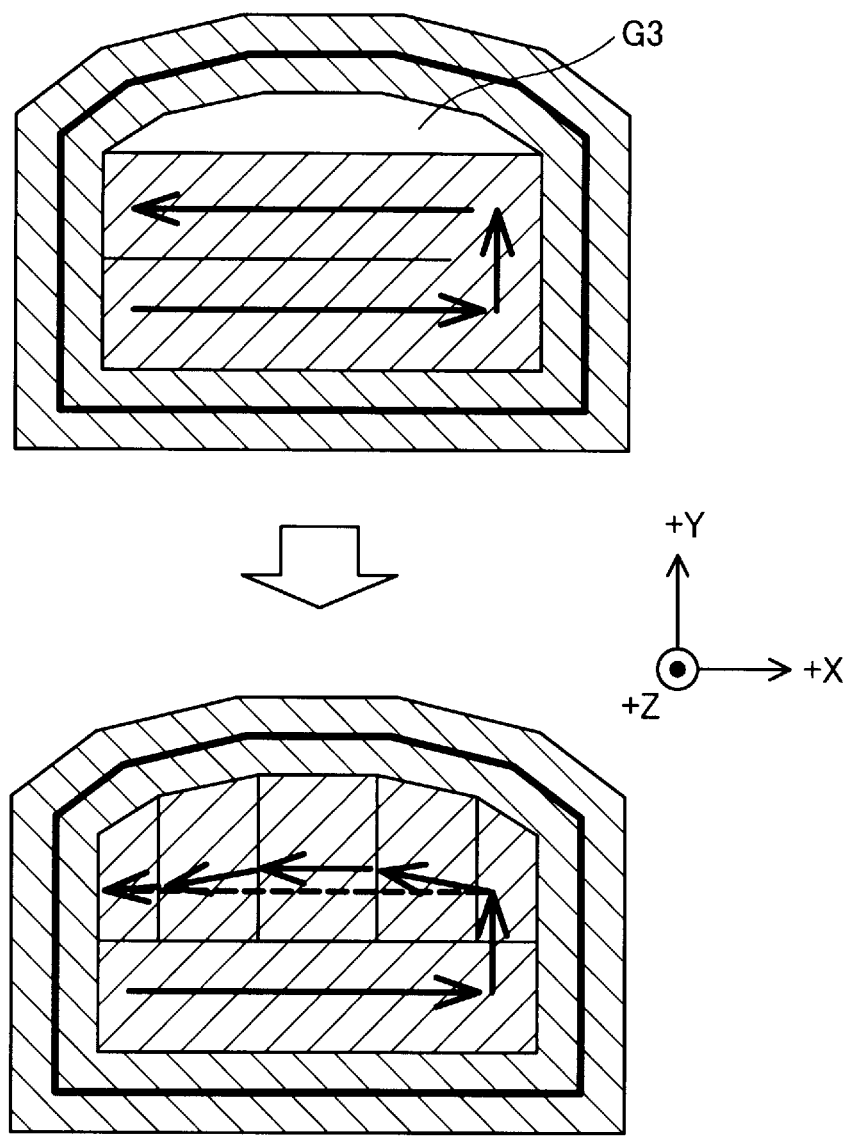
FIG. 17 is a diagram showing the data change processing according to the third embodiment.

In the present embodiment, it is preferable that the data generation unit 102 generates the shaping data by further changing, as shown in FIG. 17, the second partial path to a path having a shape corresponding to a shape of the gap portion G3. In FIG. 17, the divided partial paths are changed from linear paths indicated by broken lines to paths along an arc shape of the gap portion. The path change is implemented, for example, by changing the paths so as to pass through a center of paths at two sides that sandwich the gap portion. In this manner, the gap portion can be more efficiently covered and shaping accuracy can be improved by changing the second partial path to a path having a shape corresponding to the shape of the gap portion.

Figure 18:
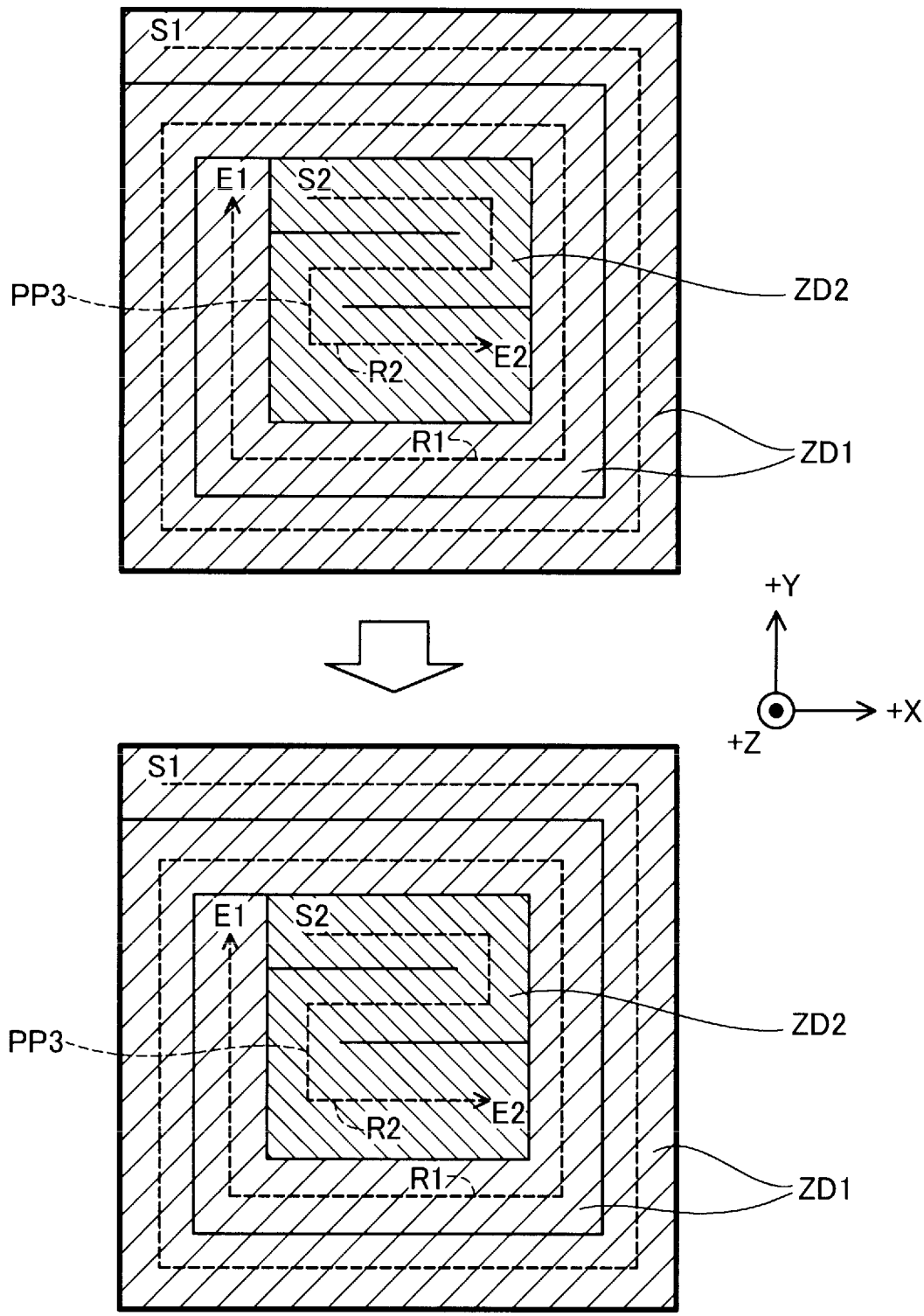
FIG. 18 is a diagram showing the data change processing according to the third embodiment.

A change in the shape of the path according to the shape of the gap portion includes, for example, a change in a length of a partial path PP3 that is coupled to the second partial path R2 or a change in a position of the second partial path R2, such that the linear second partial path R2 passes through a center of the shaping material whose line width is changed as shown in FIG. 18.

D. Other Embodiments (D-1) In the embodiments described above, the ABS resin material in a pellet form is used as a raw material supplied to the material supply unit 20. On the other hand, the three-dimensional shaping device 100 can use various materials such as a thermoplastic material, a metal material, and a ceramic material as main materials to form a three-dimensional shaped object. Here, a "main material" refers to a material serving as a main component used for forming the shape of the three-dimensional shaped object or refers to a material having content of 50% or more by weight in the three-dimensional shaped object. The above-described shaping material includes a material obtained by melting the main materials alone or by melting the main materials and a part of components contained with the main materials into a paste form.

When the thermoplastic material is used as the main material, the shaping material is generated by plasticizing the material in the shaping material generation unit 30. "Plasticize" refers to that the thermoplastic material is heated and melted.

Examples of the thermoplastic material may include the following thermoplastic resin materials.
Example of Thermoplastic Resin Material General-purpose engineering plastic such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone Additives such as a pigment, a metal, a ceramic, a wax, a flame retardant, an antioxidant, and a heat stabilizer may be mixed into the thermoplastic material. The thermoplastic material is converted into a state of being plasticized and melted by rotation of the flat screw 40 and heating of the heater 58 in the shaping material generation unit 30. The shaping material generated by melting the thermoplastic material is hardened by a decrease in temperature after being discharged from the nozzle 61.

It is desirable that the thermoplastic material is emitted from the nozzle 61 in a state of being heated at a temperature equal to or higher than a glass transition point of the thermoplastic material and being completely melted. For example, a glass transition point of the ABS resin is about 120° C. It is desirable that the ABS resin is emitted from the nozzle 61 at about 200° C. In order to emit the shaping material in such a high temperature state, a heater may be provided around the nozzle 61.

The following metal material, for example, may be used as the main material in the three-dimensional shaping device 100 instead of the above-described thermoplastic material. In this case, it is desirable that the following metal material is formed into a powder material, a component melted at the time of generating the shaping material is mixed into the powder material, and then the mixed material is added into the shaping material generation unit 30 as a raw material.
Example of Metal Material A single metal such as magnesium (Mg), iron (Fe), cobalt (Co), chromium (Cr), aluminum (Al), titanium (Ti), copper (Cu), and nickel (Ni), or an alloy containing one or more of these metals
Example of Alloy Maraging steel, stainless steel, cobalt chromium molybdenum, titanium alloy, nickel alloy, aluminum alloy, cobalt alloy, cobalt chromium alloy A ceramic material may be used as the main material in the three-dimensional shaping device 100 instead of the above-described metal material. Examples of the ceramic material may include an oxide ceramic such as silicon dioxide, titanium dioxide, aluminum oxide, zirconium oxide, and a non-oxide ceramic such as aluminum nitride. When the above-described metal material or ceramic material is used as the main material, the shaping material placed on the stage 210 may be hardened by, for example, irradiating with a laser or sintering with hot air or the like.

A powder material of the metal material or the ceramic material that is added into the material supply unit 20 as a raw material may be a mixed material obtained by mixing a plurality of types of powders including a powder of a single metal or a powder of an alloy and a powder of a ceramic material. The powder material of the metal material or the ceramic material may be coated with, for example, a thermoplastic resin as illustrated in the above-described example, or a thermoplastic resin other than the thermoplastic resin. In this case, the thermoplastic resin may be melted in the shaping material generation unit 30 to exhibit flowability.

The following solvents, for example, may be added to the powder material of the metal material or the ceramic material that is added into the material supply unit 20 as a raw material. One solvent or a combination of two or more solvents selected from the following solvents may be used.
Example of Solvent Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, isopropyl acetate, n-butyl acetate, and isobutyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetate, sulfoxide-based solvents such as dimethyl sulfoxide and diethyl sulfoxide, pyridine-based solvents such as pyridine, γ-picoline, and 2,6-lutidine, tetraalkylammonium acetates such as tetrabutylammonium acetate, and ionic liquids such as butyl carbitol acetate, and the like In addition, the following binder, for example, may be added to the powder material of the metal material or the ceramic material that is added into the material supply unit 20 as a raw material.

Example of Binder

Acrylic resin, epoxy resin, silicone resin, cellulose-based resin, synthetic resin, polylactic acid (PLA), polyamide (PA), polyphenylene sulfide (PPS), polyether ether ketone (PEEK), or other thermoplastic resins (D-2) In the embodiments described above, the shaping unit 110 plasticizes a material by the flat screw 40. On the other hand, the shaping unit 110 may plasticize the material by, for example, rotating an in-line screw. The shaping unit 110 may adopt a head used in a fused deposition modeling (FDM).

(D-3) In the embodiments described above, the opening and closing mechanism 70 may be implemented with a mechanism using a plunger in which a piston protrudes into the flow path 65 and closes the flow path 65, or a mechanism using a shutter that moves in a direction intersecting the flow path 65 and closes the flow path 65. The opening and closing mechanism 70 may be implemented with combining two or more of the butterfly valve in the embodiments described above, the above-described shutter mechanism and plunger mechanism. The discharge amount of the shaping material may be controlled by controlling a rotation speed of the flat screw 40 instead of the opening and closing mechanism 70.

(D-4) In the embodiments described above, the discharge control data included in the shaping data includes information indicating a discharge amount of the shaping material, and the width of the shaping material stacked on the stage 210 is increased by increasing the discharge amount. On the other hand, the discharge control data may include moving speed information indicating a moving speed of the discharge unit 60. In this case, in the data change processing in step S150 shown in FIG. 5, the width of the shaping material stacked on the stage 210 can be increased by reducing a moving speed associated with the second partial path. In this case, it is preferable that an amount of the shaping material discharged per unit time is constant for shaping each partial path. However, the width of the shaping material stacked on the stage 210 can be adjusted by adjusting both the discharge amount of the shaping material and the moving speed of the discharge unit 60.

(D-5) In the embodiments described above, the data generation unit 102 generates, as the second shaping data ZD2, a discharge path that covers the inner area by reciprocately moving the discharge unit 60 along the predetermined reference direction and gradually moving the discharge unit 60 in a direction orthogonal to the reference direction in the XY plane. On the other hand, the data generation unit 102 may generate the second shaping data so as to cover the inner area with a spiral discharge path.

(D-6) In the embodiments described above, the outer shell area of the three-dimensional shaped object is shaped by the first shaping data, and the inner area is shaped by the second shaping data. On the other hand, the shaping data may not be distinguished into the first shaping data and the second shaping data. The three-dimensional shaped object may be shaped by a single type of shaping data.

E. Other Aspects

The present disclosure is not limited to the embodiments described above, and may be implemented with various configurations without departing from the scope of the present disclosure. For example, in order to solve some or all problems described above, or to achieve some or all effects described above, technical characteristics in the embodiments corresponding to technical characteristics in aspects described below can be replaced or combined as appropriate. Unless described as essential in the present specification, the technical characteristics can be deleted as appropriate.

(1) According to a first aspect of the present disclosure, provided is a three-dimensional shaped object manufacturing method for manufacturing a three-dimensional shaped object by discharging a shaping material from a discharge unit towards a stage to stack a layer. The manufacturing method is a three-dimensional shaped object manufacturing method for manufacturing a three-dimensional shaped object by discharging a shaping material from a discharge unit towards a stage to stack a layer. The manufacturing method includes a first step of generating intermediate data including (i) path data indicating, by a plurality of partial paths, a path through which the discharge unit discharges the shaping material while being moved and (ii) discharge control data including at least one of discharge amount information indicating a discharge amount of the shaping material in each of the partial paths and moving speed information indicating a moving speed of the discharge unit in each of the partial path, a second step of analyzing the intermediate data to specify a gap portion interposed between a first partial path and a second partial path through which the shaping material is discharged from the discharge unit later than through the first partial path, a third step of generating shaping data from the intermediate data by changing the discharge control data corresponding to the second partial path so as to increase, in the second partial path, a width of the shaping material stacked on the stage or on the layer that is previously formed, and a fourth step of shaping the three-dimensional shaped object by controlling the discharge unit according to the shaping data.

According to this aspect, even when the gap portion is interposed between the first partial path and the second partial path through which the shaping material is discharged later than through the first partial path, since the shaping data is generated such that the width of the shaping material stacked on the stage or on the layer that is previously formed is increased in the second partial path through which the shaping material is discharged later, the discharge unit does not need to be moved from a position away from the gap portion to the gap portion in order to cover the gap portion during shaping the three-dimensional shaped object. Therefore, shaping accuracy of the three-dimensional shaped object can be prevented from lowering due to the shaping material sagging from the discharge unit.

(2) In the three-dimensional shaped object manufacturing method according to the above-described aspect, the first partial path may be a part of a path for shaping an outer shell area along an outer shell of the three-dimensional shaped object, and the second partial path may be a part of a path for shaping an inner area which is an area other than the outer shell area in the three-dimensional shaped object.

According to this aspect, a gap portion between the outer shell area along the outer shell of the three-dimensional shaped object and the inner area which is an area other than the outer shell area can be covered by increasing the width of the shaping material stacked on the stage or on the layer that is previously formed in the second partial path for shaping the inner area.

(3) In the three-dimensional shaped object manufacturing method according to the above-described aspect, the shaping data may be generated in the third step such that the path for shaping the outer shell area and the path for shaping the inner area are continuous paths.

According to this aspect, since the outer shell area and the inner area of the three-dimensional shaped object can be continuously shaped, shaping accuracy of the three-dimensional shaped object can be prevented from lowering due to the shaping material sagging from the discharge unit.

(4) In the three-dimensional shaped object manufacturing method according to the above-described aspect, the shaping data may be generated in the third step such that the width of the shaping material stacked on the stage or on the layer that is previously formed in the second partial path is changed according to a width change of the gap portion.

According to this aspect, the gap portion can be covered with high accuracy.

(5) In the three-dimensional shaped object manufacturing method according to the above-described aspect, the shaping data may be generated in the third step such that the second partial path included in the path data is changed according to a shape of the gap portion.

According to this aspect, the gap portion can be covered with high accuracy.

(6) In the three-dimensional shaped object manufacturing method according to the above-described aspect, when a relationship of W≤Smax−Ss is satisfied in which Ss is a reference width of the shaping material stacked on the stage or on the layer in the partial paths, Smax is a maximum width of the shaping material that can be stacked on the stage in the partial paths, and W is a width of the gap portion, only the discharge control data corresponding to the second partial path may be changed in the third step.

According to this aspect, the gap portion can be effectively covered by increasing the width of the shaping material stacked in the second partial path.

(7) In the three-dimensional shaped object manufacturing method according to the above-described aspect, when a relationship of W>Smax−Ss is satisfied in which Ss is a reference width of the shaping material stacked on the stage or on the layer in the partial paths, Smax is a maximum width of the shaping material that can be stacked on the stage in the partial paths, and W is a width of the gap portion, the shaping data may be generated in the third step such that in addition to the second partial path, the discharge control data corresponding to the first partial path may be changed so as to increase the width of the shaping material stacked on the stage or on the layer that is previously formed in the first partial path.

According to this aspect, the gap portion can be covered by not only increasing the width of the shaping material stacked in the second partial path but also increasing the width of the shaping material stacked in the first partial path.

(8) According to a second aspect of the present disclosure, provided is a three-dimensional shaped object manufacturing method for manufacturing a three-dimensional shaped object by discharging a shaping material from a discharge unit towards a stage to stack a layer. The manufacturing method includes a first shaping step of shaping a first part of the three-dimensional shaped object by moving the discharge unit on the stage while discharging the shaping material from the discharge unit such that an interval between adjacent stacked shaping materials is a first interval, and a second part shaping step of shaping a second part other than the first part on the layer such that the second part is in contact with the first part by discharging the shaping material from the discharge unit such that the width of the shaping material stacked on the stage or on the layer that is previously formed is larger than the width of the shaping material stacked on the stage or on the layer that is previously formed in the first part shaping step.

According to this aspect, since the three-dimensional shaped object can be shaped such that a gap is not generated between the first part and the second part, the discharge unit does not need to be moved from a position away from the gap portion to the gap portion in order to cover the gap portion. Therefore, shaping accuracy of the three-dimensional shaped object can be prevented from lowering due to the shaping material sagging from the discharge unit.

The present disclosure is not limited to the three-dimensional shaped object manufacturing method described above, and may be implemented in various aspects such as a three-dimensional shaping device, a three-dimensional shaping system, and a three-dimensional shaping device control method.

What is claimed is:

1. A three-dimensional shaped object manufacturing method for manufacturing a three-dimensional shaped object by discharging a shaping material from a discharge unit towards a stage to stack a layer, the shaping material passing through a flow path having a valve, the three-dimensional shaped object manufacturing method comprising:
  a first step of generating intermediate data including (i) path data indicating, by a plurality of partial paths, a path through which the discharge unit discharges the shaping material while being moved and (ii) discharge control data including at least one of discharge amount information indicating a discharge amount of the shaping material in each of the partial paths and moving speed information indicating a moving speed of the discharge unit in each of the partial paths;
  a second step of analyzing the intermediate data to specify a gap portion interposed between a first partial path and a second partial path through which the shaping material is discharged from the discharge unit later than through the first partial path;
  a third step of generating shaping data from the intermediate data by changing the discharge control data corresponding to the second partial path so as to increase, in the second partial path, a reference width of the shaping material stacked on the stage or on the layer that is previously formed; and
  a fourth step of shaping the three-dimensional shaped object by controlling the discharge unit according to the shaping data,
  wherein the reference width of the shaping material is changed by controlling the discharge amount of the shaping material via the valve,
  in a case in which a relationship of W≤Smax−Ss is satisfied, the discharge control data corresponding to only the second partial path is changed to increase the reference with of the shaping material of the second partial path in the third step,
  in a case in which a relationship of W>Smax−Ss is satisfied, the discharge control data corresponding to both the first partial path and the second partial path is changed to increase the reference with of the shaping material of the first and second partial paths in the third step, and
  the Ss is the reference width, the Smax is a maximum width of the shaping material, and the W is the width of the gap portion.

2. The three-dimensional shaped object manufacturing method according to claim 1, wherein the first partial path is a part of a path for shaping an outer shell area along an outer shell of the three-dimensional shaped object, and the second partial path is a part of a path for shaping an inner area which is an area other than the outer shell area in the three-dimensional shaped object.

3. The three-dimensional shaped object manufacturing method according to claim 2, wherein the shaping data is generated in the third step such that the path for shaping the outer shell area and the path for shaping the inner area are continuous paths.

4. The three-dimensional shaped object manufacturing method according to claim 1, wherein the shaping data is generated in the third step such that the reference width of the shaping material stacked on the stage or on the layer that is previously formed in the second partial path is changed according to a width change of the gap portion.

5. The three-dimensional shaped object manufacturing method according to claim 1, wherein the shaping data is generated in the third step such that the second partial path included in the path data is changed according to a shape of the gap portion.

6. A three-dimensional shaped object manufacturing method for manufacturing a three-dimensional shaped object by discharging a shaping material from a discharge unit towards a stage to stack a layer, the shaping material passing through a flow path having a valve, the three-dimensional shaped object manufacturing method comprising:

a first part shaping step of shaping a first part of the three-dimensional shaped object by moving the discharge unit on the stage while discharging the shaping material from the discharge unit such that an interval between adjacent stacked shaping materials is a first interval; and a second part shaping step of shaping a second part other than the first part on the layer such that the second part is in contact with the first part by discharging the shaping material from the discharge unit such that a width of the shaping material stacked on the stage or on the layer that is previously formed is larger than a width of the shaping material stacked on the stage or on the layer that is previously formed in the first part shaping step, wherein the width of the shaping material is changed by controlling a discharge amount of the shaping material via the valve, a gap portion is interposed between a first partial path and a second partial path through which the shaping material is discharged from the discharge unit later than through the first partial path, in a case in which a relationship of $W \leq S_{max} - S_s$ is satisfied, only the width of the shaping material for the second partial path is increased, in a case in which a relationship of $W > S_{max} - S_s$ is satisfied, the width of the shaping material for both the first partial path and the second partial path is increased, and the $S_s$ is the width, the $S_{max}$ is a maximum width of the shaping material, and the $W$ is a width of the gap portion.

7. The three-dimensional shaped object manufacturing method according to claim 1, wherein, in the third step, when a length of the gap portion is equal to or less than a first threshold and the gap portion is surrounded by a one-stroke path, the discharge control data corresponding to all paths that form the one-stroke path is changed so as to increase the reference width of the shaping material stacked on the stage or on the layer that is previously formed.

8. The three-dimensional shaped object manufacturing method according to claim 6, wherein, when a length of the gap portion is equal to or less than a first threshold and the gap portion is surrounded by a one-stroke path, the width of the shaping material for all paths that form the one-stroke path is increased.

* * * * *